United States Patent
Sueoka et al.

(10) Patent No.: US 8,689,444 B2
(45) Date of Patent: Apr. 8, 2014

(54) METHOD AND DEVICE FOR ADJUSTING VALVE CLEARANCE

(75) Inventors: Hisayuki Sueoka, Tokyo (JP); Yasuyoshi Miyauchi, Tokyo (JP); Yasuo Morise, Tokyo (JP); Tatsumi Otomura, Tokyo (JP)

(73) Assignee: Hirata Corporation, Tokyo (JP)

( * ) Notice: Subject to any disclaimer, the term of this patent is extended or adjusted under 35 U.S.C. 154(b) by 407 days.

(21) Appl. No.: 12/996,527

(22) PCT Filed: Jun. 6, 2008

(86) PCT No.: PCT/JP2008/060502
§ 371 (c)(1),
(2), (4) Date: Apr. 19, 2011

(87) PCT Pub. No.: WO2009/147751
PCT Pub. Date: Dec. 10, 2009

(65) Prior Publication Data
US 2011/0185569 A1    Aug. 4, 2011

(51) Int. Cl.
*B23P 6/00*    (2006.01)

(52) U.S. Cl.
USPC .............. 29/890.121; 123/90.25; 137/15.18

(58) Field of Classification Search
USPC ........ 29/890.121, 890.124, 213.1; 123/90.16, 123/90.18, 90.24, 90.25, 90.39, 90.44; 137/15.01, 15.18; 702/94
See application file for complete search history.

(56) References Cited

U.S. PATENT DOCUMENTS 6,546,347 B2 *    4/2003    Batchelor et al. ............... 702/94

FOREIGN PATENT DOCUMENTS

| JP | 8-150525 | 6/1996 |
| JP | 9-303120 | 11/1997 |
| JP | 11-173124 | 6/1999 |
| JP | 2000-308928 | 11/2000 |
| JP | 2006-328976 | 12/2006 |

* cited by examiner

*Primary Examiner* — David Bryant
*Assistant Examiner* — Ryan J Walters
(74) *Attorney, Agent, or Firm* — Bacon & Thomas, PLLC

(57) ABSTRACT

A method for adjusting a valve clearance in a cylinder head using a rocker arm of a support point adjustable type. In the method, an adjustment screw is rotated in one direction until a camshaft comes in contact with a cam shaft contact section to make the amount of valve opening zero, then further rotated until the valve is released with a certain valve opening amount, and after that, rotated in a reverse direction by a certain rotation angle and accordingly loosened until a desired valve clearance value is obtained. In the process above, the method determines a first rotation angle of the adjustment screw necessary for the adjustment screw to move from a position where the valve is released with the certain valve opening amount to a position where the camshaft comes in contact with the camshaft contact section. Then, the method determines a second rotation angle of the adjustment screw necessary for the adjustment screw to move from the position where the camshaft comes in contact with the camshaft contact section to a position where the desired valve clearance value can be obtained. After that, the method rotates the adjustment screw in the reverse direction by a given rotation angle that is a sum of the first and second rotation angles.

6 Claims, 21 Drawing Sheets

US 8,689,444 B2

METHOD AND DEVICE FOR ADJUSTING VALVE CLEARANCE

TECHNICAL FIELD OF THE INVENTION

The present invention relates to a method and device for adjusting a valve clearance which is established to accommodate variations due to thermal expansion in an internal combustion engine.

RELATED ART

Internal combustion engines, in particular, vehicle engines are equipped with inlet and exhaust valves to draw and exhaust mixed gas, and these valves are opened or closed when the mixed gas is drawn or exhausted. The opening and closing of the valves are controlled by camshafts.

A manner of opening the inlet valve or the exhaust valve by means of a cam on the camshaft includes a direct acting type in which the cam directly pushes a valve lifter to thereby open or close the valve, and a rocker arm type in which the cam pushes the valve via an arm, which is referred to as a rocker arm, for opening or closing the valve.

The inlet and exhaust valves are thermally expanded due to heat from a combustion chamber. Because timings of drawing and exhausting air will be changed when the valves are thermally expanded, a clearance (a valve clearance) for adjustment is defined, in order to accommodate variations due to the thermal expansion, between the cam and the valve lifter (or a camshaft contact section of the rocker arm) in a state where the cam does not push the valve lifter or the camshaft contact section (a roller, a slipper surface) of the rocker arm.

While an engine is being assembled and fabricated, in general, the valve clearance is automatically adjusted in a valve clearance adjusting device after the valves are assembled in the cylinder head. Further, after the adjustment, the valve clearance is actually measured and checked.

A valve clearance adjusting method includes that described in Patent Document 1, for example. In this valve clearance adjusting method, an adjusting screw (an adjustment screw) of the rocker arm is rotated in a forward direction to push the valve through the rocker arm by an amount of displacement that exceeds the valve clearance, and thereafter rotated in a reverse direction to return the valve to an original fixed position. Then, an instant when the displacement is stopped at the returning of the valve to the fixed position valve is detected by a means for detecting a stop of displacement, and a location of the rocker arm at that instant is recognized as a zero position of clearance zero. After that, the adjusting screw is rotated in the same reverse direction by a predetermined angle to establish the valve clearance, and locked by a lock nut to disable rotation of the adjusting screw. In this context, the valve clearance denotes a gap between a top part of a bridge member for connecting valve retainers for each valve in a pair of right and left valves and an end part on a valve side of the rocker arm.

On the other hand, a valve clearance adjusting device includes that described in Patent Document 2, for example. This valve clearance adjusting device allows setting of a valve clearance between an adjustment screw and a valve in a condition of an actual machine incorporating a cylinder head and a cylinder block. In addition, an adjustment head for adjusting the valve clearance is disposed movably along a guide rail in a vertical direction, and lifted up and down by a predetermined stroke when driven by a lifting actuator such as a cylinder.

Moreover, regarding a roller rocker arm, a roller rocker arm including no rocker shaft (a rocker arm of a support point adjustable type) is suggested, for example, as described in Patent Document 3.

Patent Document 1: JP-A-2004-245111
Patent Document 2: Japan Patent No. 2830715
Patent Document 3: JP-A-H05-65810

DISCLOSURE OF THE INVENTION

Problems to be Solved by the Invention

Here, in the rocker arm of the support point adjustable type as described in Patent Document 3, when the valve clearance is adjusted by rotating the adjustment screw, a support point (a rotating position) is shifted depending on whether or not the camshaft and the roller rocker arm are in contact with each other. Such shifting of the support point complicates a relationship between a rotation angle of the adjustment screw and an amount of change of the valve clearance, and accordingly makes it difficult to accurately adjust the valve clearance with respect to which an accuracy on the order of $\mu m$ is required.

On the other hand, in both inventions described in Patent Documents 1 and 2, after a zero point where the valve clearance becomes 0 is initially found, a given valve clearance value is adjusted based on the zero point. However, because the zero point itself is inaccurate, the valve clearance adjusted based on such an inaccurate zero point is problematic in terms of a degree of accuracy.

An object of the present invention, which was conceived in view of the aforesaid circumstances, is to provide a valve clearance adjusting method and device capable of accurately adjusting a valve clearance in a cylinder head using a rocker arm of a support point adjustable type.

Means for Solving the Problems

In order to attain the above-described object, an invention according to one aspect of the present invention is a valve clearance adjusting method for adjusting a valve clearance in a cylinder head comprising a valve incorporated in a cylinder head body, a rocker arm connected at one end thereof to an end of the valve, an adjustment screw screwably connected to the other end of the rocker arm and having a lower end section swingably supported by the cylinder head body, and a camshaft contacted by a camshaft contact section of a circular-shaped surface in the rocker arm and capable of rotating to open and close the valve. The method is characterized in that
in a process of rotating the adjustment screw in one direction to tighten up the adjustment screw until the valve is released with a desired valve opening amount, and subsequently rotating the adjustment screw in a reverse direction by a certain rotation angle to loosen the adjustment screw from a position where the valve is released with the certain valve opening amount to a position where the camshaft is separated from the camshaft contact section by a desired valve clearance value;
while the camshaft is in contact with the camshaft contact section, the rocker arm is rotated using both a center of the circular-shaped surface of the camshaft contact section and the other end of the rocker arm as a support point, and, based on a relationship between an adjustment screw rotating angle and a valve opening amount during rotation of the rocker arm, a first rotation angle by which the adjustment screw should be rotated to reach a position where the camshaft comes in contact with the camshaft contact section from the position where the valve is released with the certain valve opening amount is determined, while the camshaft is separated from the camshaft contact section, the rocker arm is rotated using one end of the rocker arm as the support point, and, based on a relationship between the adjustment screw rotating angle and the valve clearance value during rotation of the rocker arm, a second rotation angle by which the adjustment screw should rotated to reach a position where the desired valve clearance value is obtained from the position where the camshaft comes in contact with the camshaft contact section is determined, and the adjustment screw is rotated in the reverse direction by a given rotation angle which is a sum of the first and second rotation angles.

A valve clearance adjusting method according to claim 2 of the present invention is a method for adjusting a valve clearance in a cylinder head comprising a valve incorporated in a cylinder head body, a rocker arm connected at one end thereof to an end of the valve, an adjustment screw screwably connected to the other end of the rocker arm and having a lower end section swingably supported by the cylinder head body, and a camshaft contacted by a camshaft contact section of a circular-shaped surface in the rocker arm and capable of rotating to open and close the valve. The method comprises:

a tightening step in which the valve is lifted up by rotating the adjustment screw in one direction to tighten up the adjustment screw from a state where the camshaft is separated from the camshaft contact section via a state of valve opening amount zero where the camshaft comes in contact with the camshaft contact section up to a state where the valve is released with a certain valve opening amount;

a valve opening amount measuring step of measuring, in real time, an opening amount of the valve in a measurement means while the valve is open;

a backlash removing step of rotating the adjustment screw in a reverse direction to loosen the adjustment screw until it reaches a given backlash removing position between the state where the valve is released and the state of valve opening amount zero, and a clearance adjusting step of further rotating the adjustment screw in the reverse direction until a desired valve clearance value is obtained between the camshaft and the camshaft contact section which are separated from each other subsequent to the state of the valve opening amount zero. The method is characterized in that;

in a process of rotating the adjustment screw by a given angle in the reverse direction to loosen the adjustment screw from the backlash removing position to a position where the desired valve clearance value is obtained in the clearance adjusting step, while the camshaft is in contact with the camshaft contact section, the rocker arm is rotated using both a center of the circular-shaped surface of the camshaft contact section and the other end of the rocker arm as a support point, and, based on a relationship between an adjustment screw rotating angle and a valve opening amount during rotation of the rocker arm, a first rotation angle by which the adjustment screw should be rotated to reach the position where the camshaft comes in contact with the camshaft contact section from the backlash removing position is determined;

while the camshaft is separated from the camshaft contact section, the rocker arm is rotated using one end of the rocker arm as the support point, and, based on a relationship between the adjustment screw rotating angle and the valve clearance value during rotation of the rocker arm, a second rotation angle by which the adjustment screw should be rotated to reach the position where the desired valve clearance value is obtained from the position where the camshaft comes in contact with the camshaft contact section is determined, and the adjustment screw is rotated in the reverse direction by a given rotation angle which is a sum of the first and second rotation angles.

According to the above-described method, in the cylinder head using the rocker arm of a support point adjustable type which exhibits different behaviors depending on whether or not the camshaft is in contact with the camshaft contact section, the valve clearance can be adjusted with a high degree of precision by differently adjusting the rotation angle of the adjustment screw between when the camshaft is in contact with the camshaft contact section and when they are separated from each other.

An invention according to another aspect is a valve clearance adjusting method as previously described, further comprising, as a previous step of the tightening step, a fitting operation step. In the method, the step of fitting operation comprises rotating the adjustment screw in the one direction to thereby tighten the adjustment screw from an initial state where the camshaft is separated from the camshaft contact section until the valve is released with the certain valve opening amount;

thereafter, maintaining the certain released state of the valve for a first stabilization time, and thereafter, rotating the adjustment screw in the reverse direction to thereby loosen the adjustment screw from the certain released state of the valve to the initial state.

An invention according to another aspect is a variation of a valve clearance adjusting method as previously described. In the method when the adjustment screw is rotated in a tightening direction, a valve moving amount is found based on a measurement value from a valve opening amount measuring unit for measuring an opening amount of the valve, and rotation of the adjustment screw is stopped based on the valve moving amount, and when the adjustment screw is rotated in a loosening direction, an adjustment screw moving amount is found based on a rotation value of a servomotor for rotating the adjustment screw, and rotation of the adjustment screw is stopped based on the adjustment screw moving amount.

An invention according another aspect is a variation of a valve clearance adjusting method as previously described, in which in the backlash removing step, while backlash is removed by rotating the adjustment screw in the reverse direction to loosen the adjustment screw until it reaches the given backlash removing position between the state where the valve is released and the state of valve opening amount zero, a valve moving amount calculated by the servomotor for rotating and controlling the adjustment screw is compared with a valve opening amount actually measured by the measurement means to obtain a difference therebetween, and the difference is fed back to the servomotor to correct for the rotating and controlling.

An invention according to another aspect is a variation of a valve clearance adjusting method as previously described, further comprising a first stabilization step of maintaining a present state for a given second stabilization time between the valve opening amount measuring step and the backlash removing step, and a second stabilization step of maintaining a present state for a given third stabilization time between the backlash removing step and the clearance adjusting step.

An invention according to another aspect of the present invention is a valve clearance adjusting device for adjusting a valve clearance in a cylinder head comprising at least one valve incorporated in a cylinder head body, a rocker arm connected at one end thereof to an end of the valve, an adjustment screw screwably connected to the other end of the rocker arm and having a lower end section swingably supported by the cylinder head body, and a camshaft contacted by a camshaft contact section of the rocker arm and capable of rotating to open and close the valve. The valve clearance adjusting device comprises a conveyor device for conveying the cylinder head placed on a pallet along a predetermined conveying direction;

a lifting unit disposed on a position in the conveying device for relatively lifting up and down the cylinder head from a conveyed height and positioning the cylinder head;

a camshaft rotating unit including a rotary coupling part which is installed in a condition capable of moving closer to and away from the camshaft in the positioned cylinder head, and allowed to couple with the camshaft;

a valve clearance adjusting unit installed in a condition capable of moving to or moving away from the adjustment screw of the positioned cylinder head to rotate the adjustment screw, and a valve opening amount measuring unit disposed below to the cylinder head having been positioned, to measure an opening amount of the valve.

According to the above-described configuration, the cylinder head using the rocker arm of a support point adjustable type which exhibits different behaviors depending on whether or not the camshaft is in contact with the camshaft contact section can be loaded in the pallet, and conveyed on the pallet and positioned. Then, after the camshaft in the cylinder head having been positioned is rotated to fit a cam phase, the valve clearance can be adjusted by rotating the adjustment screw for each valve.

An invention according to another aspect is a variation of a valve clearance adjusting device as previously described, wherein the valve clearance adjusting unit comprises a nut runner part including at least one nut runner for rotating the adjustment screw, and a first lifting part connected to the nut runner part, for lifting up and down the nut runner part relative to the adjustment screw.

An invention according to another aspect is a variation of a valve clearance adjusting device as previously described, wherein the valve clearance adjusting unit further comprises a slide unit for separately sliding the nut runner in the nut runner part along a horizontal direction.

An invention according to another aspect is a variation of a valve clearance adjusting device as previously described, wherein the slide unit comprises a slide unit body part fixed to the first lifting part, and an actuator fixed to the body part and connected to the nut runner.

An invention according to another aspect is a variation of a valve clearance adjusting device as previously described, wherein the nut runner part comprises a plurality of nut runners, and actuators which are the same in number as the number of the nut runners are provided and independently driven to slide each of the nut runners along a horizontal direction independently.

An invention according to another aspect is a variation of a valve clearance adjusting device as previously described, wherein the valve clearance adjusting unit further comprises a first tilt mechanism part for rotationally swinging both the nut runner part and the first lifting part about an axis of the conveying direction.

An invention according to another aspect is a variation of a valve clearance adjusting device as previously described, further comprising a hold-down unit which is provided in a condition capable of moving toward and moving away from the positioned cylinder head, for holding down the cylinder head and the rocker arm.

An invention according to another aspect is a variation of a valve clearance adjusting device as previously described, wherein the hold-down unit comprises a hold-down unit body part equipped with a cylinder head holding-down part for holding down the cylinder head and with a rocker arm holding-down part for holding down the rocker arm, and a second lifting part for lifting up and down the hold-down unit body part relative to the positioned cylinder head.

An invention according to another aspect is a variation of a valve clearance adjusting device as previously described, wherein the hold-down unit body part is composed of a U-shaped frame body, the cylinder head holding-down part suspended from an under surface of the frame body, and the rocker arm holding-down part which is disposed astride both end edges of the frame body and capable of sliding in the horizontal direction along the frame body.

An invention according to another aspect is a variation of a valve clearance adjusting device as previously described, wherein the camshaft rotating unit comprises a rotary coupling part which can be connected to the camshaft, a drive part for rotating the rotary coupling part, a third lifting part for lifting up and down the drive part and the rotary coupling part, and a slide part for slidably moving the drive part and the rotary coupling part in a horizontal direction.

An invention according to another aspect is a variation of a valve clearance adjusting device as previously described, wherein the pallet has in a central area thereof an opening, and the lifting unit includes a pallet positioning means for positioning the conveyed pallet, a fourth lifting part for lifting down the conveying device together with the pallet, and a cylinder head positioning part disposed below the opening to perform positioning of the cylinder head.

An invention according to another aspect is a variation of a valve clearance adjusting device as previously described, wherein the pallet has in a central area thereof an opening, and the lifting unit includes a pallet positioning means for positioning the conveyed pallet, a cylinder head positioning part disposed below the opening to perform positioning of the cylinder head, and a fourth lifting part for lifting up and down the cylinder head positioning part.

An invention according to another aspect is a variation of a valve clearance adjusting device as previously described, wherein the lifting unit further comprises a tilt mechanism part for rotationally swinging the conveying device and the pallet about an axis of the conveying direction.

An invention according to another aspect is a variation of a valve clearance adjusting device as previously described, further comprising a controller for controlling rotation of the adjustment screw performed by the valve clearance adjusting unit.

Effect of the Invention

According to the present invention, an excellent effect is obtained in which the valve clearance can be adjusted with a high degree of precision by differently adjusting the adjustment screw depending on whether or not the camshaft and the camshaft contact section are in contact with each other in the cylinder head using the rocker arm of a support point adjustable type.

Figure 1:
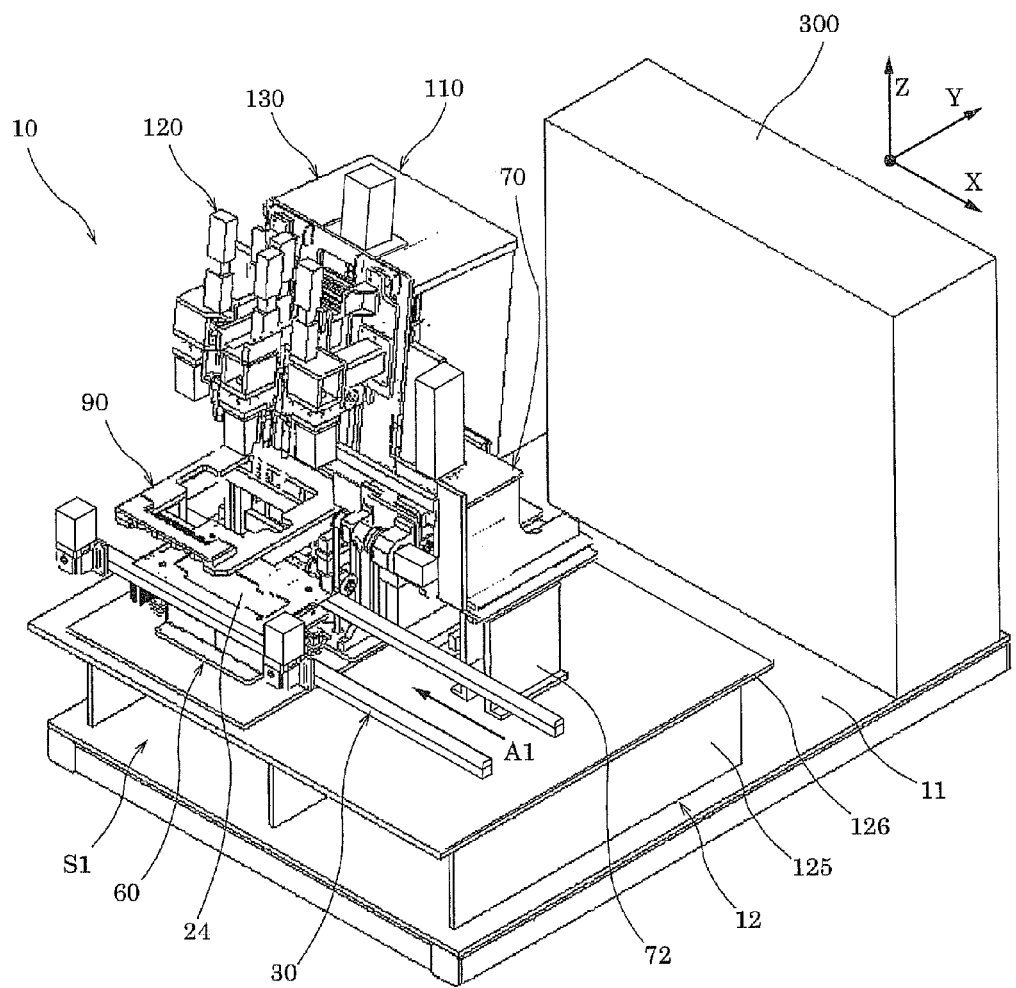
FIG. 1 is a perspective view of a valve clearance adjusting device according to a preferred embodiment of the present invention.

EXPLANATIONS OF LETTERS OR NUMERALS 10 valve clearance adjusting device
21 pallet
22 cylinder head
30 conveyor device
60 lifting unit
70 camshaft rotating unit
71 rotary coupling part
80 valve opening amount measuring unit
110 valve clearance adjusting unit
221 cylinder head body
222 valve
223 rocker arm
224 roller (camshaft contact section)
225 adjustment screw
227 camshaft
C1 center of circular surface
θ given rotation angle
θ1 first rotation angle
θ2 second rotation angle

BEST MODES FOR CARRYING OUT THE INVENTION

Hereinafter, a preferred embodiment of the present invention will be described with reference to the accompanying drawings.

Figure 2:
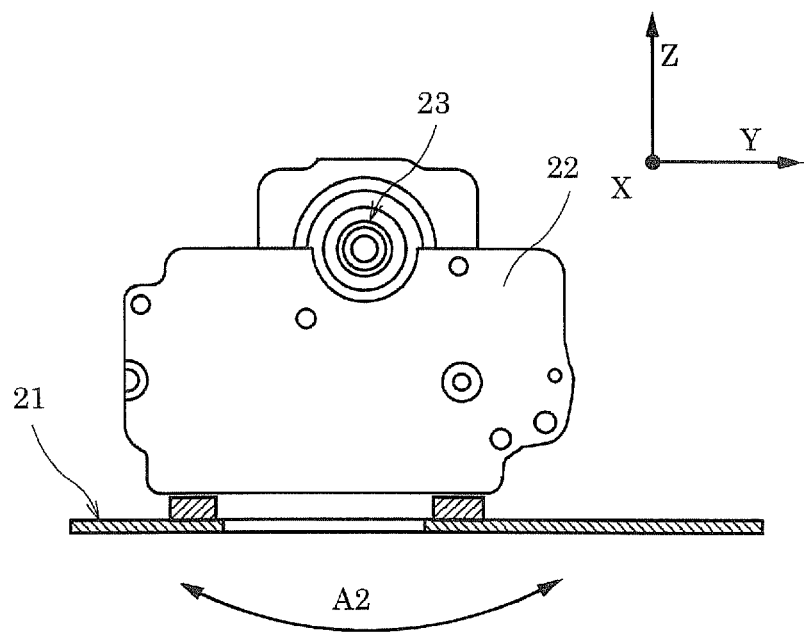
FIG. 2 is a plan view of a pallet and a cylinder head as viewed from an upstream side of a conveying direction.

A perspective external view of a valve clearance adjusting device according to the preferred embodiment of this invention is shown in FIG. 1, and a side view of a pallet and a cylinder head to be conveyed in FIG. 1 is shown in FIG. 2. Further, a front view of FIG. 1 is shown in FIG. 3, a diagram as viewed along an arrow in a direction of an arrow 4 in FIG. 3 (a right side view) is shown in FIG. 4, and a diagram as viewed along an arrow in a direction of an arrow 5 in FIG. 3 (a left side view) is shown in FIG. 5.

As shown in FIG. 1, a main body part of a valve clearance adjusting device 10 according to this embodiment is composed of various units on a base member 12 mounted on a frame 11. The base member 12 is disposed on the frame 11 in a standing position and composed of side wall panels 121 having a predetermined height and a top panel 122 which covers a space S1 bounded by the side wall panels 121. A valve opening amount measuring unit 80, which will be described below, and other units are installed in the space S1, and a part of the valve opening amount measuring unit 80 is protruded through an opening (not illustrated) formed in the top panel 122 and through a mouth 921 of a below-described table part 92.

Figure 3:
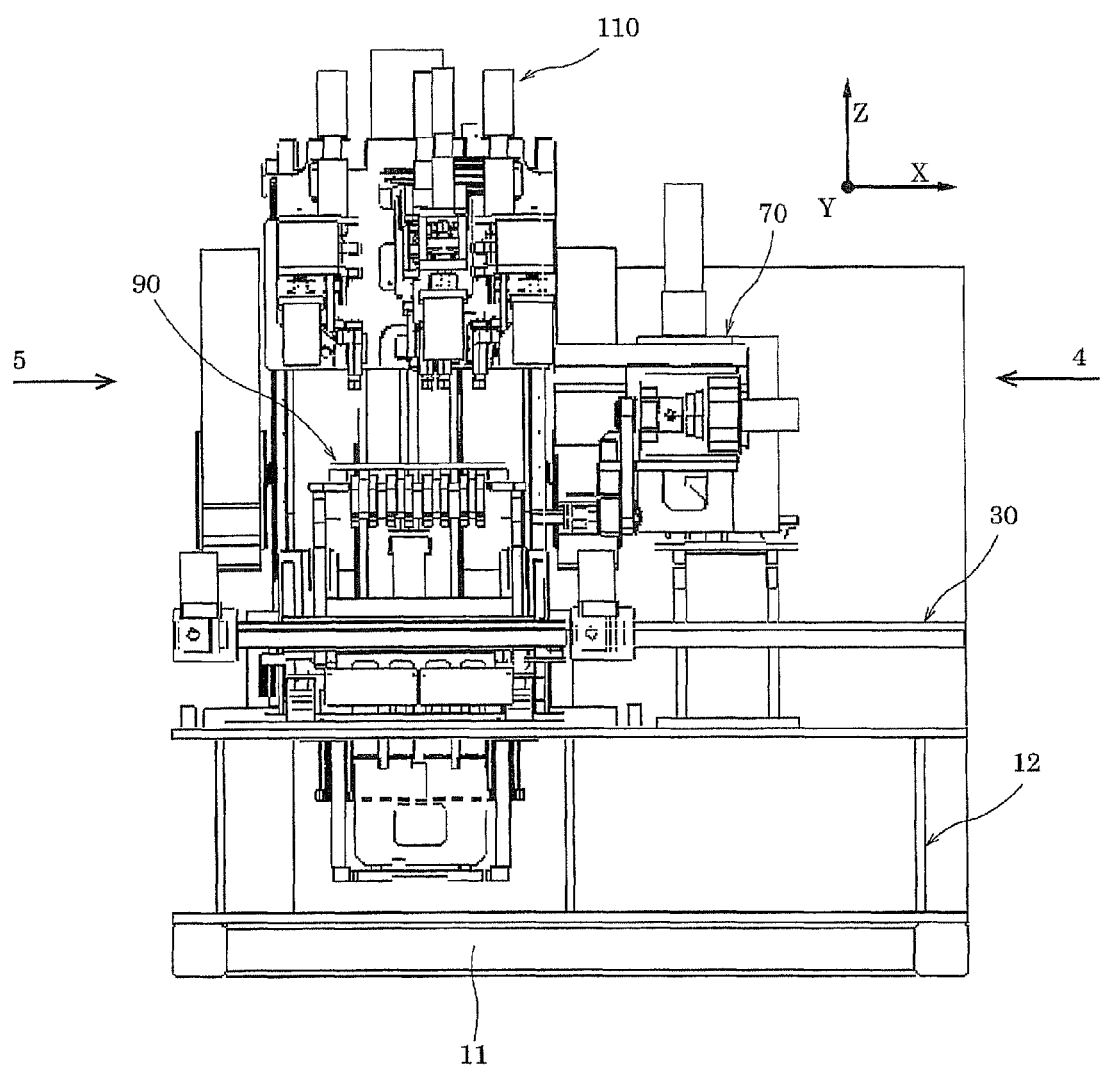
FIG. 3 is a front view of FIG. 1.
Figure 4:
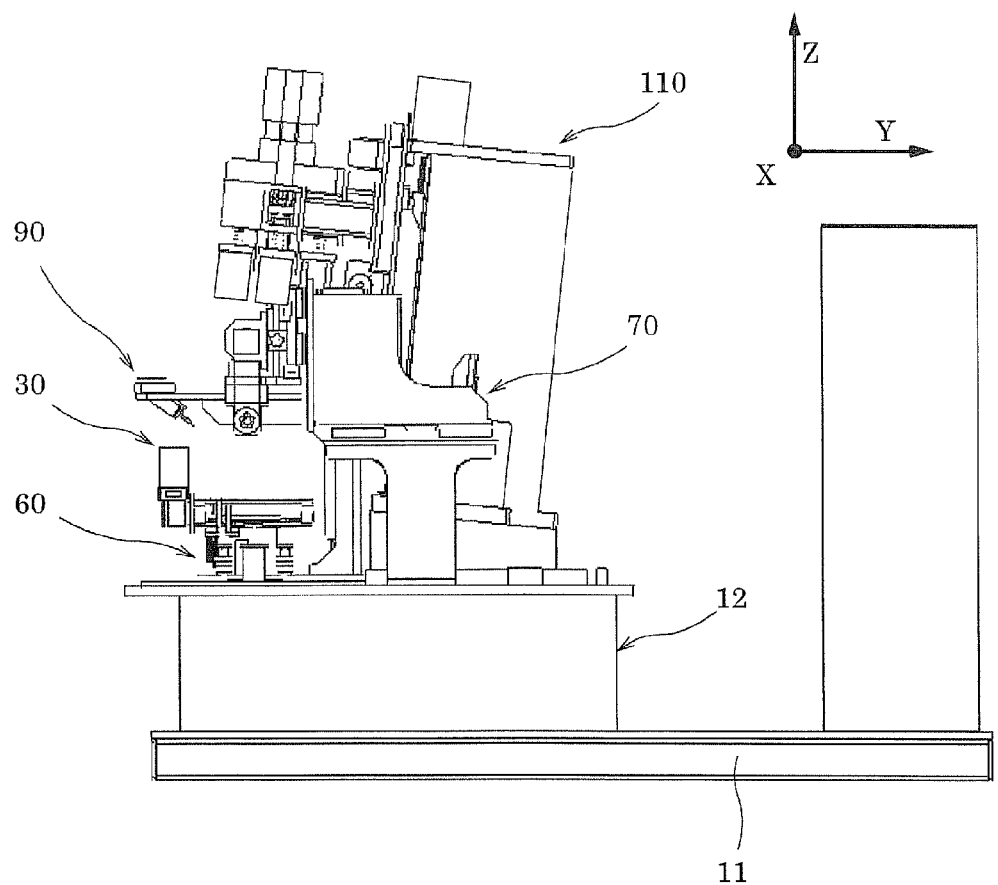
FIG. 4 is a side view as viewed along an arrow in a direction of an arrow 4 indicated in FIG. 3.
Figure 5:
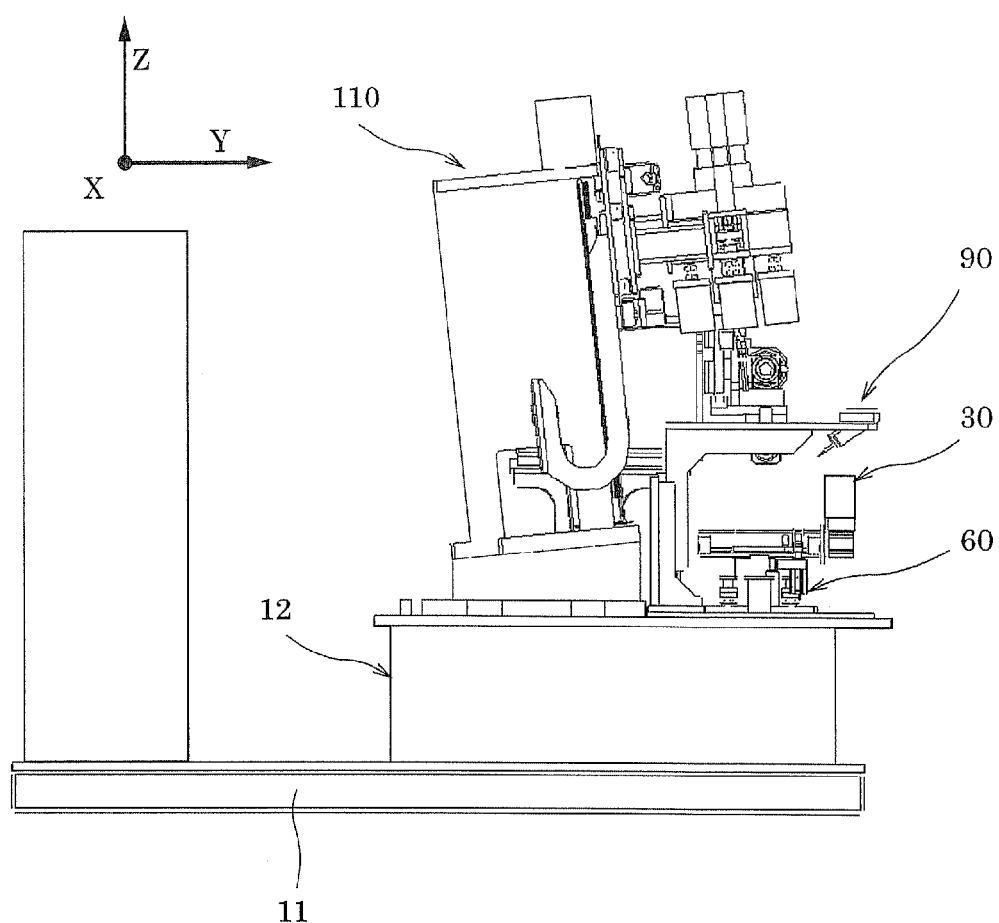
FIG. 5 is a side view as viewed along an arrow in a direction of an arrow 5 indicated in FIG. 3.

On the top panel 122, there are provided a hold-down unit 90 (refer to FIG. 5), a camshaft rotating unit 70 (refer to FIGS. 3 and 4), and a valve clearance adjusting unit 110 (refer to FIGS. 3 and 5).

Specifically, the hold-down unit 90 is provided to hold down a cylinder head 22 (refer to FIG. 2) placed on a pallet 21. On the hold-down unit 90, a lifting unit 60 is mounted, and a conveyor device 30 is supported by the lifting unit 60. The pallet 21 is conveyed along a conveying direction (an X-axis direction in FIG. 1) by the conveyor device 30. Further, a valve clearance adjusting unit 110 used for rotating an adjustment screw (which will be discussed below) is disposed at a rearward position (an upper right position in FIG. 1) of the hold-down unit 90. In addition, a camshaft rotating unit 70 for rotating a camshaft 23 (refer to FIG. 2) of the cylinder head 22 is opposed to an upstream region in the conveying direction (a direction of an arrow A1 in FIG. 1) of the conveyor device 30.

In addition to the base member 12, a controller 300 for controlling the main body part, a power supply unit (not illustrated), and others are mounted on the frame 11. The power supply unit may be incorporated in the controller 300. A safety fence (not illustrated) may be provided around the base member 12 to surround the main body part.

[Conveyor Device]

Figure 6:
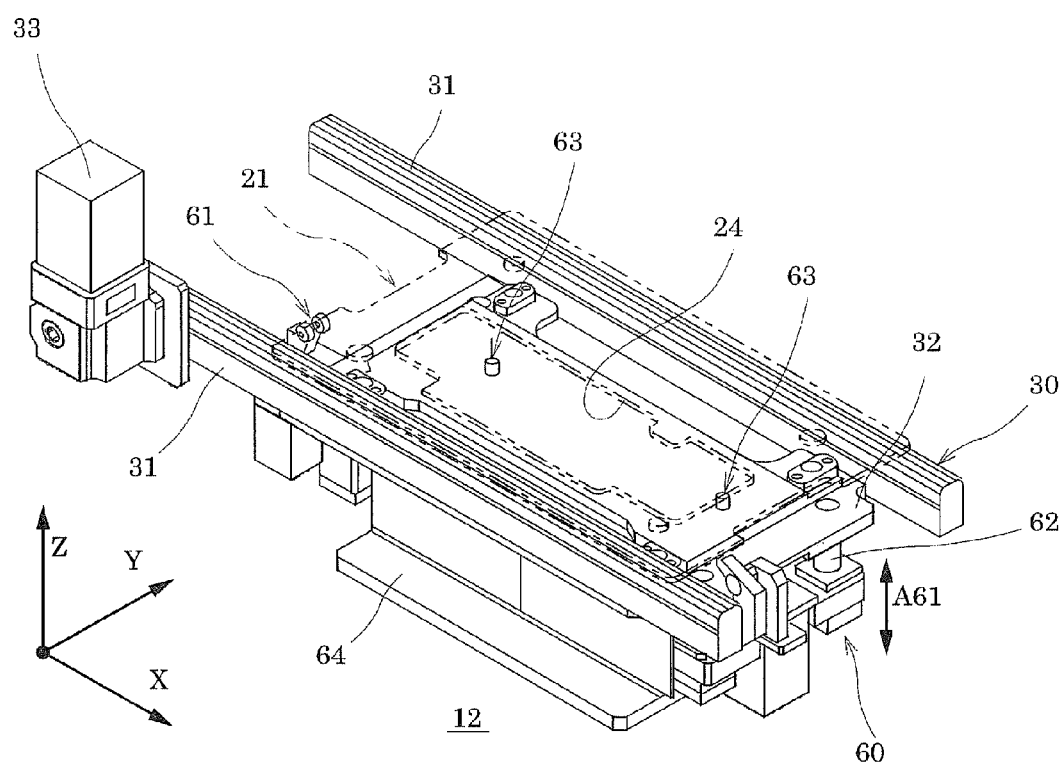
FIG. 6 is a perspective view showing a conveyor device, a lifting unit, and a pallet.

The conveyor device 30, which is composed, as shown in FIG. 6, of two rail members 31, 31, a table body part 32 for horizontally supporting the rail members 31, 31 in parallel with each other, and a conveyor drive motor 33 mounted on one rail member 31, is supported from below by the lifting unit 60 to be discussed below. The pallet 21 is placed lying astride the rail members 31, 31 and conveyed on the rail members 31, 31. The pallet 21 includes, in its center, an opening 24 from which a part of an upper surface of the table body part 32 is exposed. Both ends of the rail members 31, 31 are respectively connected to an upstream conveyor line and a downstream conveyor line which are not illustrated. The pallet 21 on the rail members 31, 31 is transferred and stopped when driven by the conveyor drive motor 33.

The conveyor device 30 may be any existing transfer conveyor including, for example, a free flow conveyor of one-drive type. The free flow conveyor may be either of a chain type or of a roller type.

[Lifting Unit]

Figure 13A:
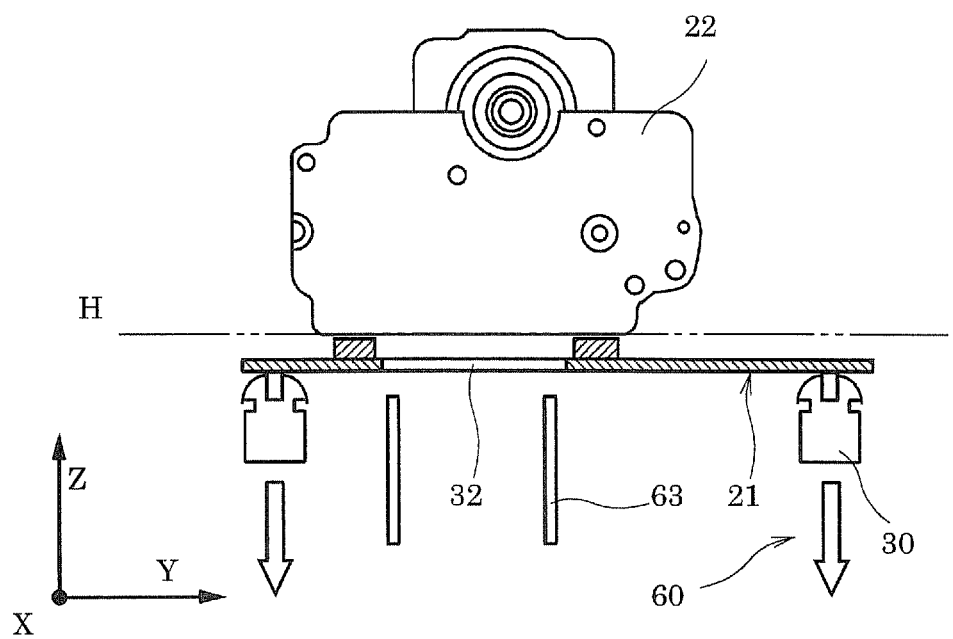
FIG. 13 is a drawing for explaining operation of lifting up and down the conveyor device, the lifting unit, and the pallet performed by the lifting unit, wherein FIG. 13 (a) shows a state before the lifting operation, while FIG. 13 (b) shows a state after the lifting operation.
Figure 13B:
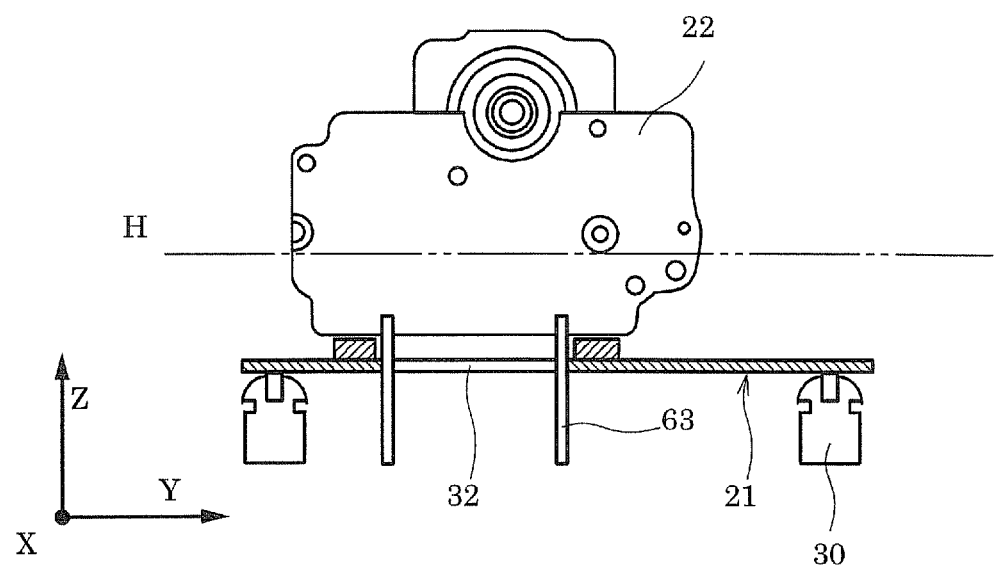
Figure 14A:
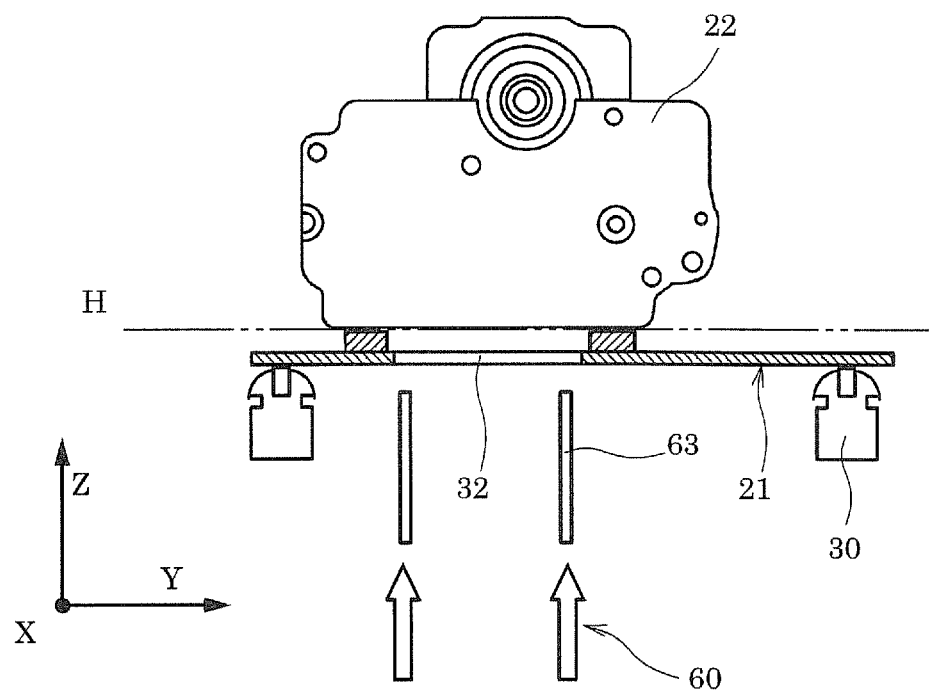
FIG. 14 is a modification of the example in FIG. 13, wherein FIG. 14 (a) shows a state before the lifting operation, while FIG. 14 (b) shows a state after the lifting operation.
Figure 14B:
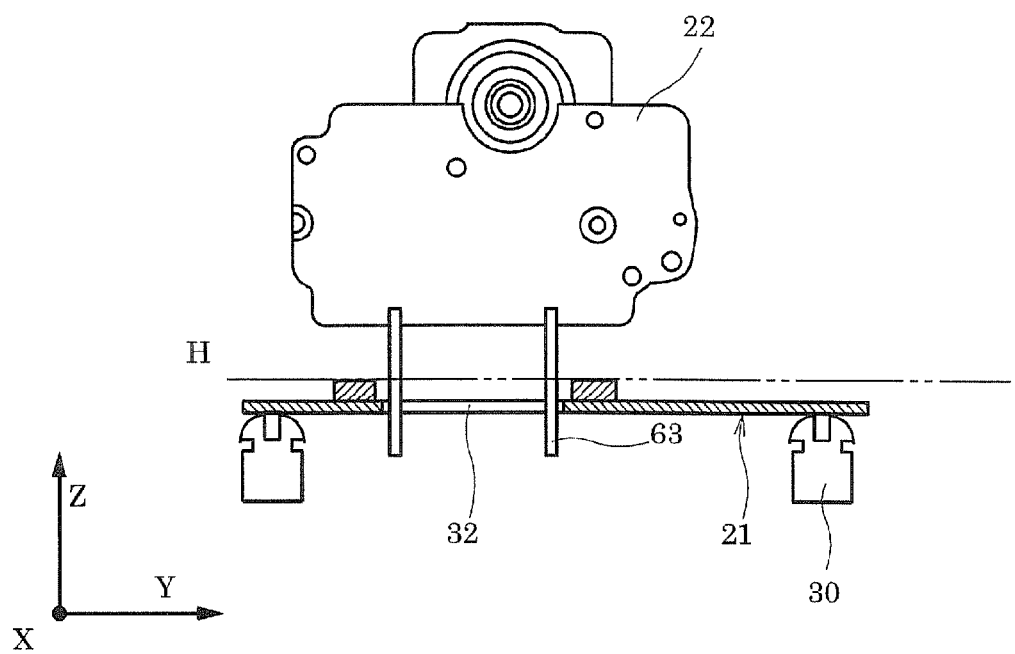

As shown in FIG. 6, a main body part 64 is provided on the base member 12. A fourth lifting part 62 is mounted on the main body part 64 in order to lift up and down the conveyor device 30 together with the pallet 21 along a direction of an arrow A6. The table body part 32 is supported from below by the fourth lifting part 62. A stopper 61 (a pallet positioning means) is installed downstream from the main body part 62 in the conveying direction to set a conveyed position of the pallet 21 to be conveyed by the conveyor device 30. In addition, a cylinder head positioning part 63 (the pallet positioning means) for positioning the cylinder head 22 is vertically mounted on a top surface of the main body part 62 at a location where the cylinder head positioning part 63 is opposed to the opening 24 of the pallet 21. The cylinder head positioning part 63 is formed to have a length with which its end (an upper end) is protruded from the table body part 32. When the cylinder head 22 situated at a height H of a conveying surface as shown in FIG. 13 (a) is lowered as shown in FIG. 13(b), the end of the cylinder head positioning part 63 is fitted into a recess (not illustrated) pre-established in an under surface of the cylinder head, which causes the cylinder head 22 to be positioned in place.

Here, rather than lowering the pallet 21 together with the conveyor device 30 by means of the lifting unit 60 to position the cylinder head 22 in place, the lifting unit 60 may only lift up the cylinder head 22 to perform the positioning without lifting the conveyor device 30 and the pallet 21. For example, the lifting unit 60 may be composed of the stopper 61 for positioning the conveyed pallet 21, a cylinder head positioning part 63 which is mounted on the under surface of the table body part 32 at a position situated below the opening 24, and a fourth lifting part 62 for lifting up and down the cylinder head positioning part 63.

Meanwhile, a second tilt mechanism part (not illustrated) may be provided in the lifting unit 60 to swing the conveyor device 30 and the pallet 21 about an X axis (about an axis of the conveying direction) as indicated by an arrow A2 in FIG. 2. The second tilt mechanism part may be configured either to entirely swing the lifting unit 60, or to swing only the conveyor device 30 and the pallet 21 without causing the fourth lifting part 62 and the cylinder head positioning part 63 to swing. In this manner, the valve clearance adjusting apparatus 10 of this embodiment can be adapted also to a V type engine in addition to a straight type engine.

[Camshaft Rotating Unit]

As shown in FIG. 1, a camshaft rotating unit 70 (a main body part 72) is uprightly disposed adjacent to the conveyor device 30 on the base member 12.

Figure 7:
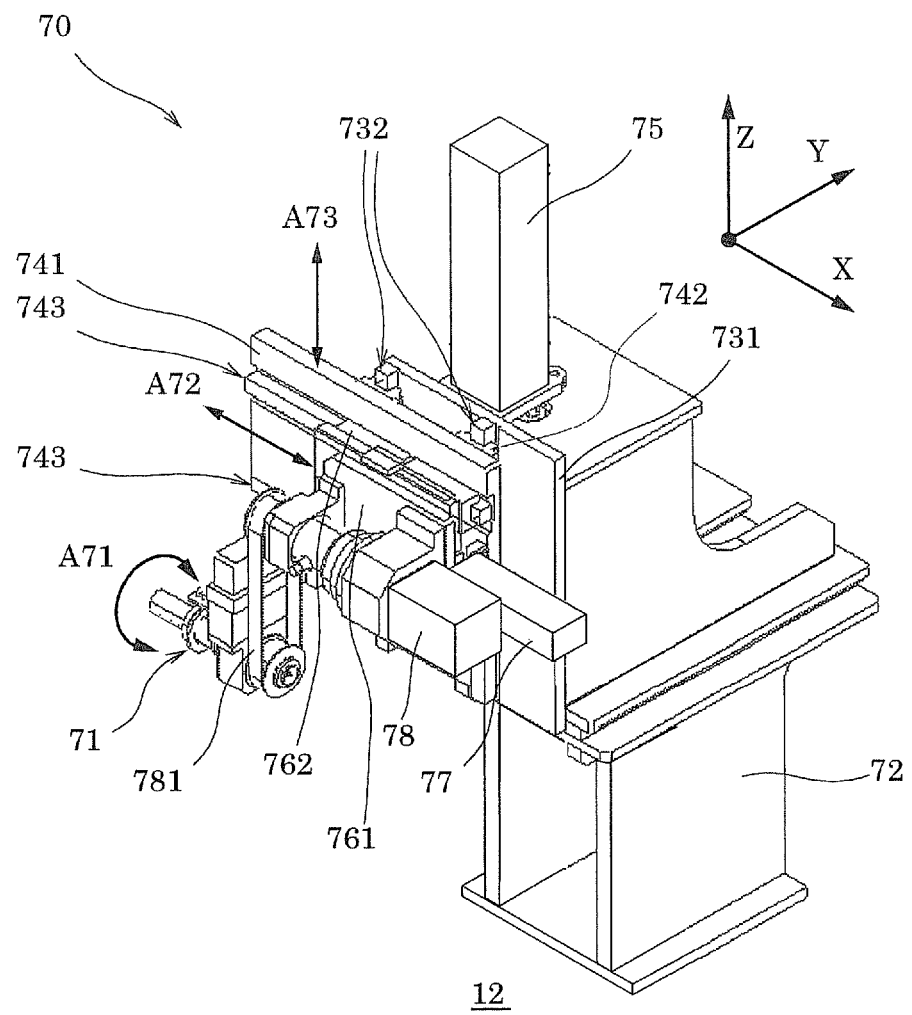
FIG. 7 is a perspective view of a camshaft rotating unit.

A first mounting plate 731 extending in a Z-X plane is installed, as shown in FIG. 7, on a conveyor device side (lower left side in the figure) of the main body part 72. At least one or more guide rails 732 (two of which are depicted in the figure) extending along a Z-axis direction are disposed on the conveyor device side of the first mounting plate 731. Further, a third lifting part actuator (an air cylinder) 75 is installed in parallel with the guide rails 732 and fixed to the main body part 72. An end of the air cylinder 75 is fixed, via a joint member insertedly provided in an opening (not illustrated) formed in the first mounting plate 731, to a second mounting plate 741 (a third lifting part) extending in the Z-X plane. The second mounting plate 741 is driven to slide along the guide rail 732 in the Z-axis direction by the air cylinder 75.

One surface of the second mounting plate 741 is equipped with linear movement guides 742 which are engaged with the above-described guide rails 732. The other surface of the second mounting plate 741 is equipped with at least one or more (two in the figure) guide rails 743 extending along the X-axis direction. Further, a sliding part actuator (an air cylinder) 77 fixed to the other surface of the second mounting plate 741 is provided in parallel with the guide rails 743. An end of the air cylinder 77 is fixed to a third mounting plate (a sliding part) 761 extending in the Z-X plane. The third mounting plate 761 is driven to slide along the guide rails 743 in the X-axis direction (a direction of an arrow A72) by the air cylinder 77.

One surface of the third mounting plate 761 is equipped with linear movement guides 762 which are engaged with the above-described guide rails 743. The other surface of the third mounting plate 761 is equipped with a drive part motor 78 (a drive part) which rotates about the X axis. The drive part motor 78 is connected via a pulley 781 to the rotary coupling part 71. The rotary coupling part 71 is rotated about the X axis through rotation of the drive part motor 78, to thereby rotate the camshaft 23 (refer to FIG. 2).

[Hold-Down Unit]

Figure 9:
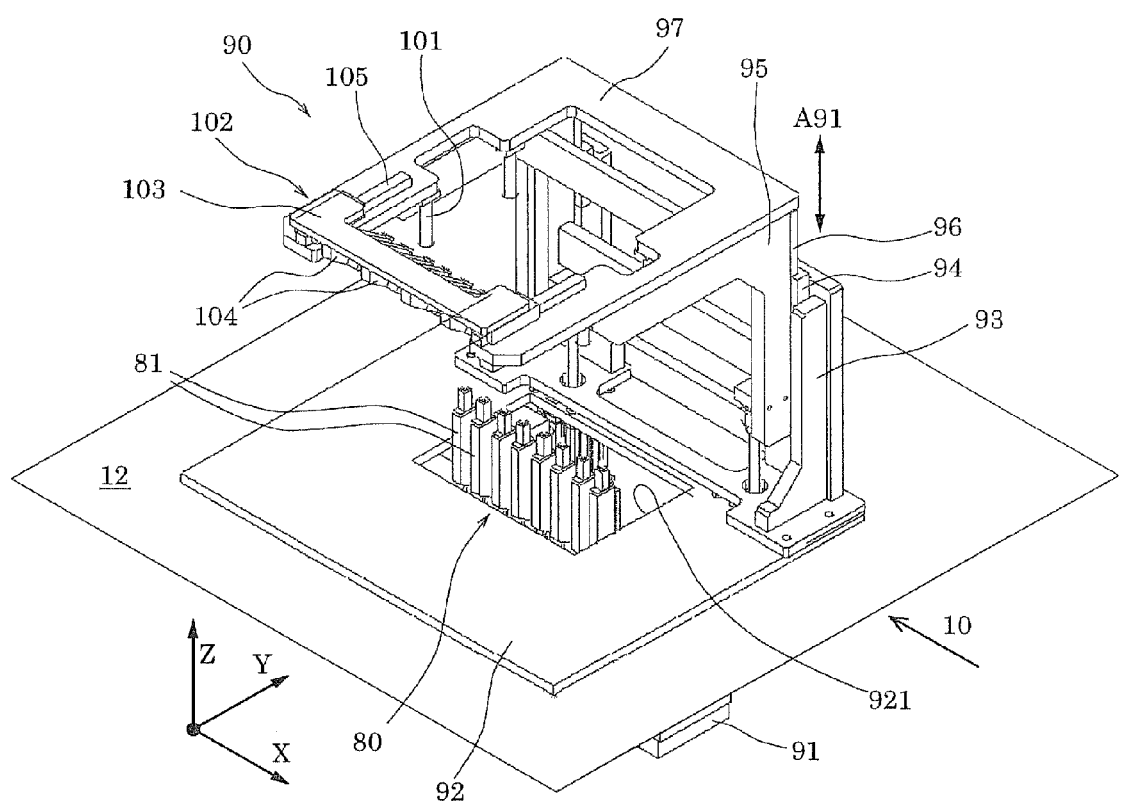
FIG. 9 is a perspective view of the hold-down unit and the valve opening amount measuring unit.

As shown in FIG. 9, the hold-down unit 90 (the table part 92) is placed on the base member 12. The mouth 921 is formed in a central region of the table part 92 extending in a Y-X plane. The valve opening amount measuring unit 80 is protruded from the mouth 921.

A lower vertical frame 93 is uprightly mounted on the table part 92 at its one end (an upper right side in FIG. 9) in the Y-axis direction. At least one or more linear movement guides 94 (two of which are depicted in the figure) extending along the Z-axis direction are provided to the lower vertical frame 93 on its one side facing toward the mouth 921. An upper vertical frame 95 is disposed so as to engage the lower vertical frame 93. The upper vertical frame 95 includes guide rails 96 engaged with the linear movement guides 94. A second lifting part actuator (an air cylinder) 98 is arranged in parallel with the guide rails 96 and fixed to an under surface of the table part 92. An end of the air cylinder 98 is fixed to the upper vertical frame 95. The upper vertical frame 95 is driven to slide along the linear movement guides 94 in the Z-axis direction (a direction of an arrow A91) by the air cylinder 98.

A U-shaped ceiling frame 97 is disposed on an upper part of the upper vertical frame 95. The ceiling frame 97 is, in its connection side, fixed to the upper vertical frame 95, and an open side of the ceiling frame 92 is defined as a tip end. A cylinder head holding-down part 101 (a first hold-down part) in the form of a rod is suspended from an under surface of the ceiling frame 97. Further, a rocker arm holding-down part 102 (a second hold-down part) is mounted so as to lie astride both nose sections of the ceiling frame 97. The rocker arm holding-down part 102 is configured, as shown in FIG. 10, to be extendable in its longitudinal direction (a direction of an arrow A92).

Figure 10:
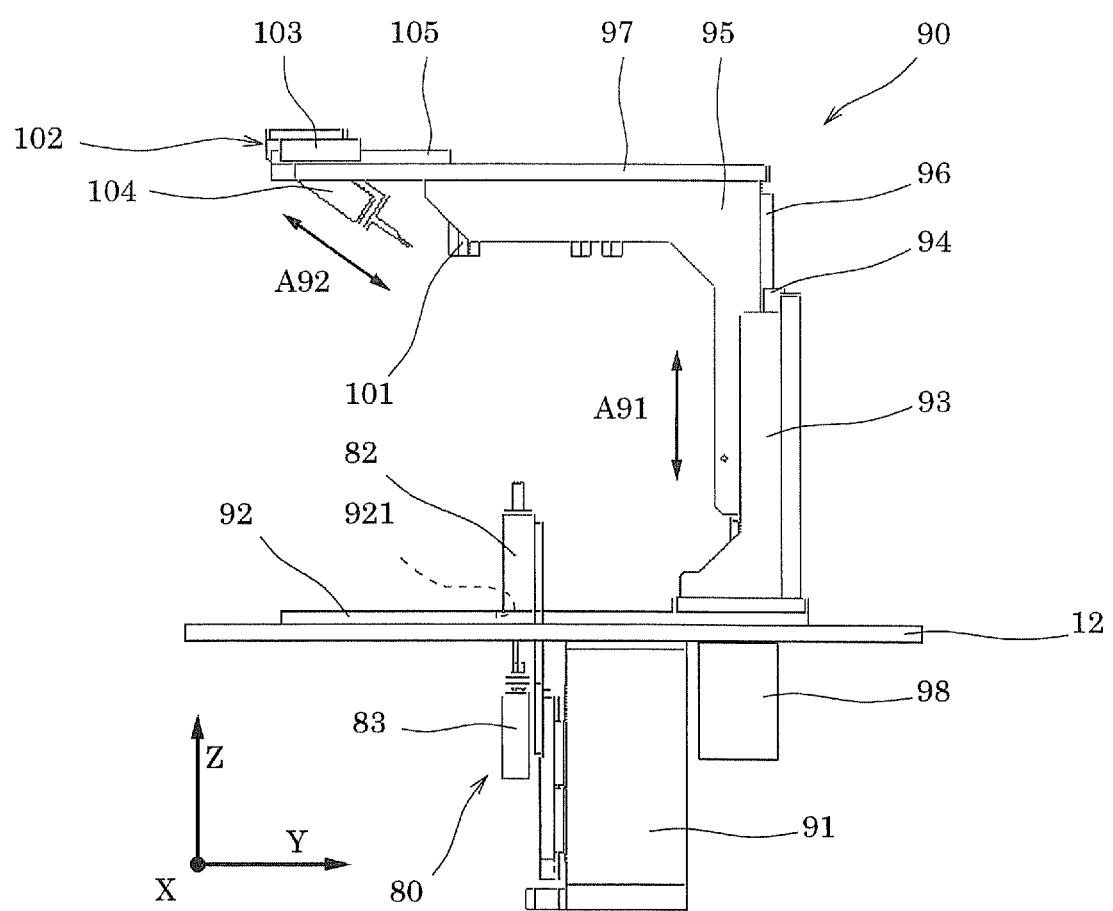
FIG. 10 is a side view as viewed along an arrow in a direction of an arrow 10 indicated in FIG. 9.

As shown in FIG. 10, the rocker arm holding-down part 102 comprises an attachment body part 103 lying astride both nose sections of the ceiling frame 97, a plurality of hold-down members 104 (eight of which are depicted in the figure) arranged along a conveying direction (the X-axis direction in the figure) on the attachment body part 103, and guide rails 105 mounted on a top surface of the ceiling frame 97 and engaged with the attachment body part 103.

The cylinder head holding-down part 101, the rocker arm holding-down part 102, and the ceiling frame 97 constitute a main body part of the hold-down unit. Meanwhile, the table part 92, the lower vertical frame 93, the linear movement guides 94, the upper vertical frame 95, the guide rails 96, and the air cylinder 98 constitute a second lifting part. The cylinder head holding-down part 101 holds down an upper surface of the cylinder head 22 while the rocker arm holding-down part 102 holds down an upper surface of a rocker arm 223 to be described later.

[Valve Opening Amount Measuring Unit]

Figure 8:
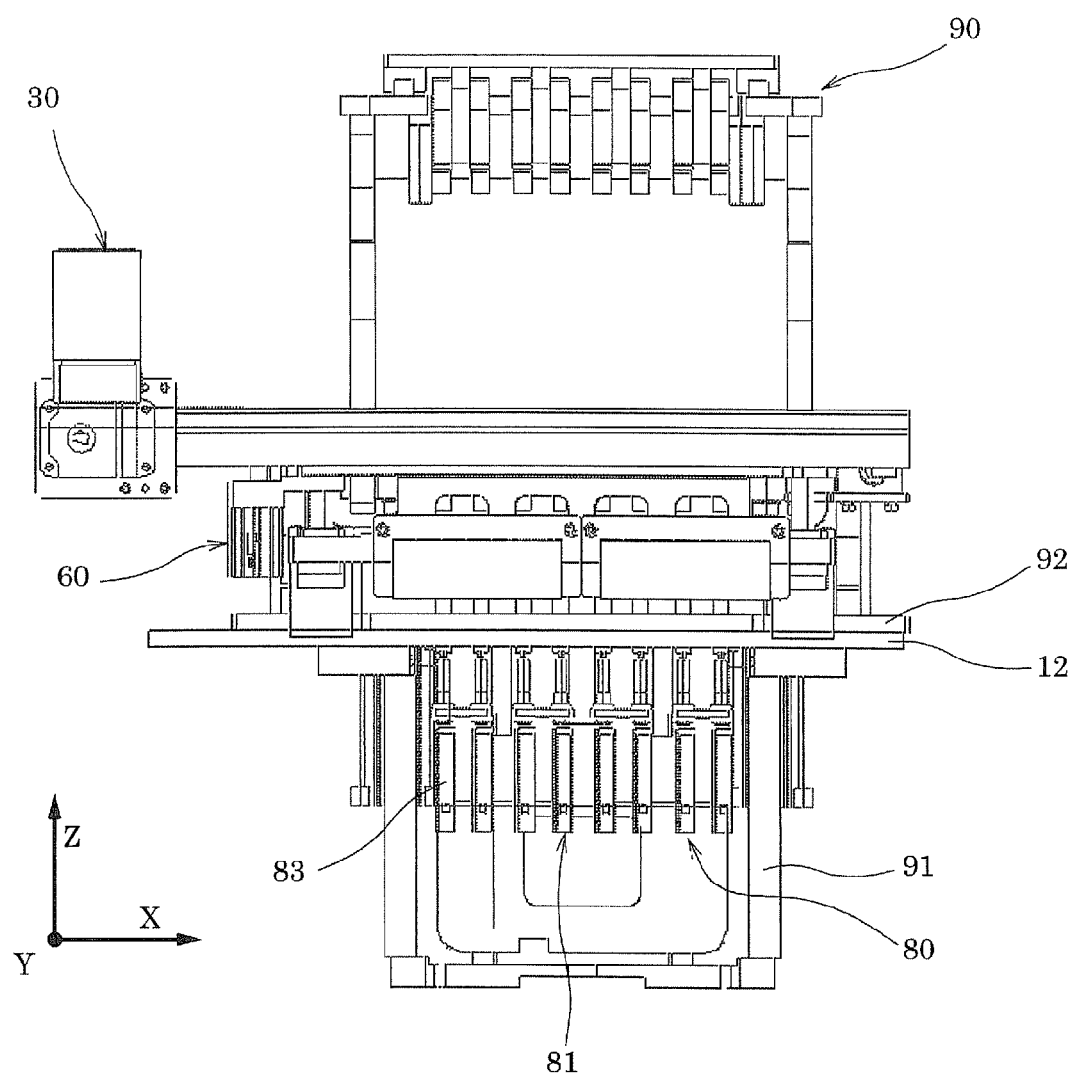
FIG. 8 is a front view showing a hold-down unit, a valve opening amount measuring unit, a conveyor device, a lifting unit, and a pallet.

As shown in FIG. 8, the valve opening amount measuring unit 80 is composed of a plurality of linear gauges 81 (eight linear gauges 81 are depicted in the figure). Each linear gauge 81 is installed along the conveying direction (the X direction in the figure) in a U-shaped gauge support frame 91 suspended from the under surface of the table part 92. As shown in FIG. 10, the linear gauge 81 consists of a main body part 82 on a distal end side (an upper end side in the figure) and a lifting part (an air cylinder) 83 on a base side (a lower end side in the figure). An end of the main body part 82 is aligned in the vertical direction (the Z-axis direction in the figure) by the air cylinder 83. A major portion of the main body part 82 is upwardly protruded from the mouth 921 in the table part 92. Each end of the linear gauge 81 is brought into contact with a below-described valve 222 (refer to FIG. 15).

[Valve Clearance Adjusting Unit]

Figure 11:
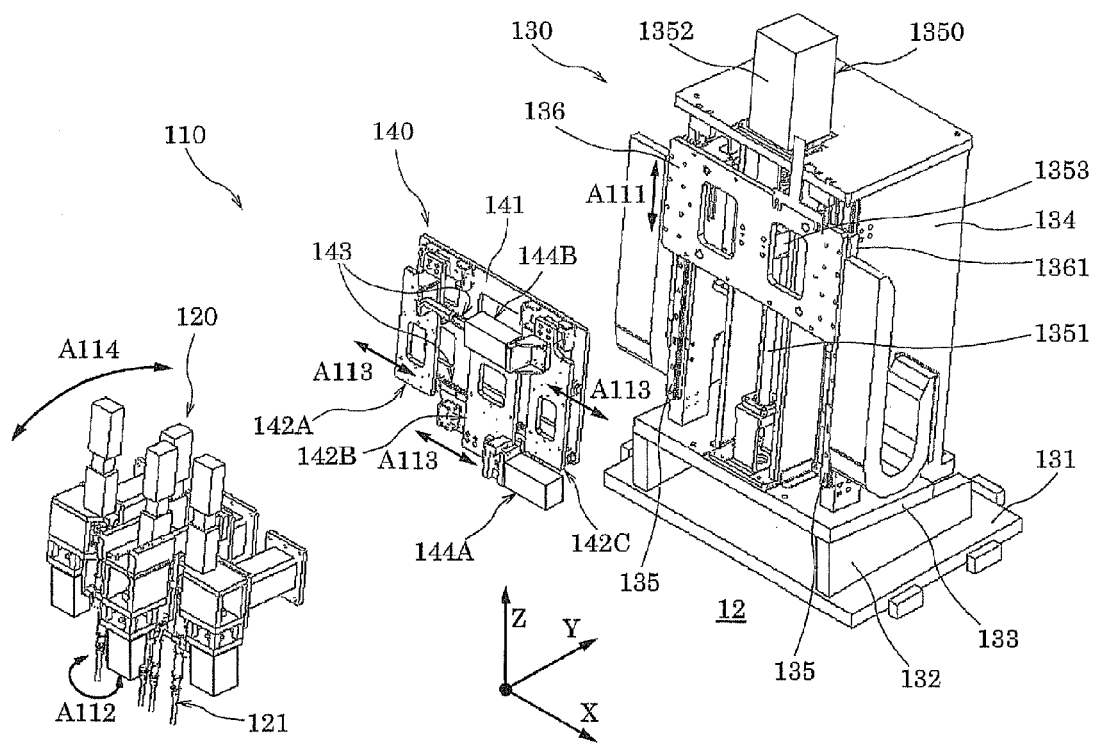
FIG. 11 is an exploded perspective view of a valve clearance adjusting unit.
Figure 12:
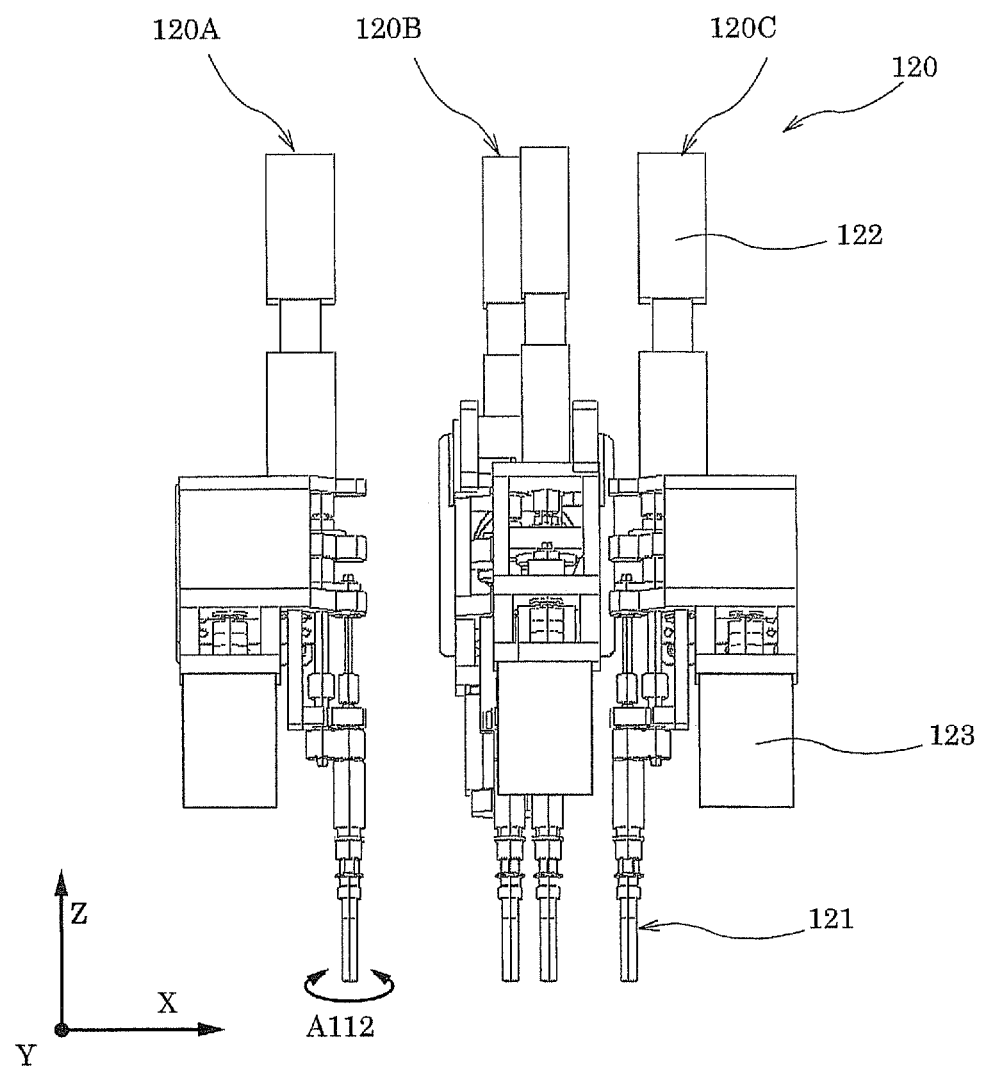
FIG. 12 is a front view of a nut runner part indicated in FIG. 11.

FIG. 11 shows an exploded perspective view of a valve clearance adjusting unit, and FIG. 12 shows an enlarged front view of a nut runner part in FIG. 11.

As shown in FIG. 11, the valve clearance adjusting unit 110 comprises the nut runner part 120 including at least one nut runner 121 for rotating the adjustment screw, a first lifting part 130 for lifting up and down the nut runner par 120 relative to the adjustment screw, and a slide unit 140 stationarily attached to the first lifting part 130 for individually sliding the nut runner 121 along a horizontal direction.

The first lifting part 130 is disposed, as shown in FIG. 1, on the base member 12. A bottom plate 131 is, as shown in FIG. 11, mounted on the base member 12, and side plates 132, 132 are uprightly disposed on the bottom plate 131. Both top surfaces of the side plates 132 are inclined in a direction toward a side (an upper right side in FIG. 11) opposite from a nut runner part mounting side. A support plate 133 is placed on both of the side plates 132. A top surface of the support plate 133 is sloped following both of the inclined side plates 132.

Vertical frames 134, 134 are uprightly mounted on the top surface of the support plate 133. At least one or more (two in the figure) guide rails 135, 135 are attached along a frame extending direction to front surfaces (a lower left side in FIG. 11) of the both vertical frames 134. Further, a first lifting mechanism (a ball screw) 135 is disposed in parallel with both of the guide rails 135. The ball screw 135 is composed of a rotatably supported screw member 1351, a servomotor 1352 for driving the screw member 1351 to rotate, and a nut member 1353 which is screwed on the screw member 1351 and capable of lifting up and down.

Both of the above-described guide rails 135 are engaged with a slide unit mounting plate 136. More specifically, linear movement guides 1361, 1361 are disposed on one surface of the slide unit mounting plate 136, and respectively mated with the guide rails 135. Further, the other surface of the slide unit mounting plate 1361 is connected and fixed to the above-described nut member 1353. The slide unit 140 is fixed to the other surface of the slide unit mounting plate 136.

The slide unit 140 is composed of a slide unit body part 141 whose one surface is attached to the slide unit mounting plate 136, and slider parts 142A to 142C which are mounted on the other surface of the slide unit body part 141 so as to be slidable in the conveying direction (the X-axis direction in FIG. 11). The other surface of the slide unit body part 141 is equipped with at least one or more guide rails 143, 143 (two of which are depicted in the figure) along the conveying direction. Both of the guide rails 143 are engaged with linear movement guides (not illustrated) of the slider parts 142A to 142C. The slider part 142B is arranged between the slider parts 142A and 142C. The other surface of the slide unit body part 141 is further equipped with a stationarily attached actuator (for example, an air cylinder) 144A whose end is coupled to the slider part 14213. An actuator 144B is stationarily attached to the slider part 142C (or the slider part 142A), and an end of the actuator 144B is coupled to the slider part 142A (or the slider part 142C). The nut runner part 120 is fixed to the slider parts 142A to 142C.

Figure 15:
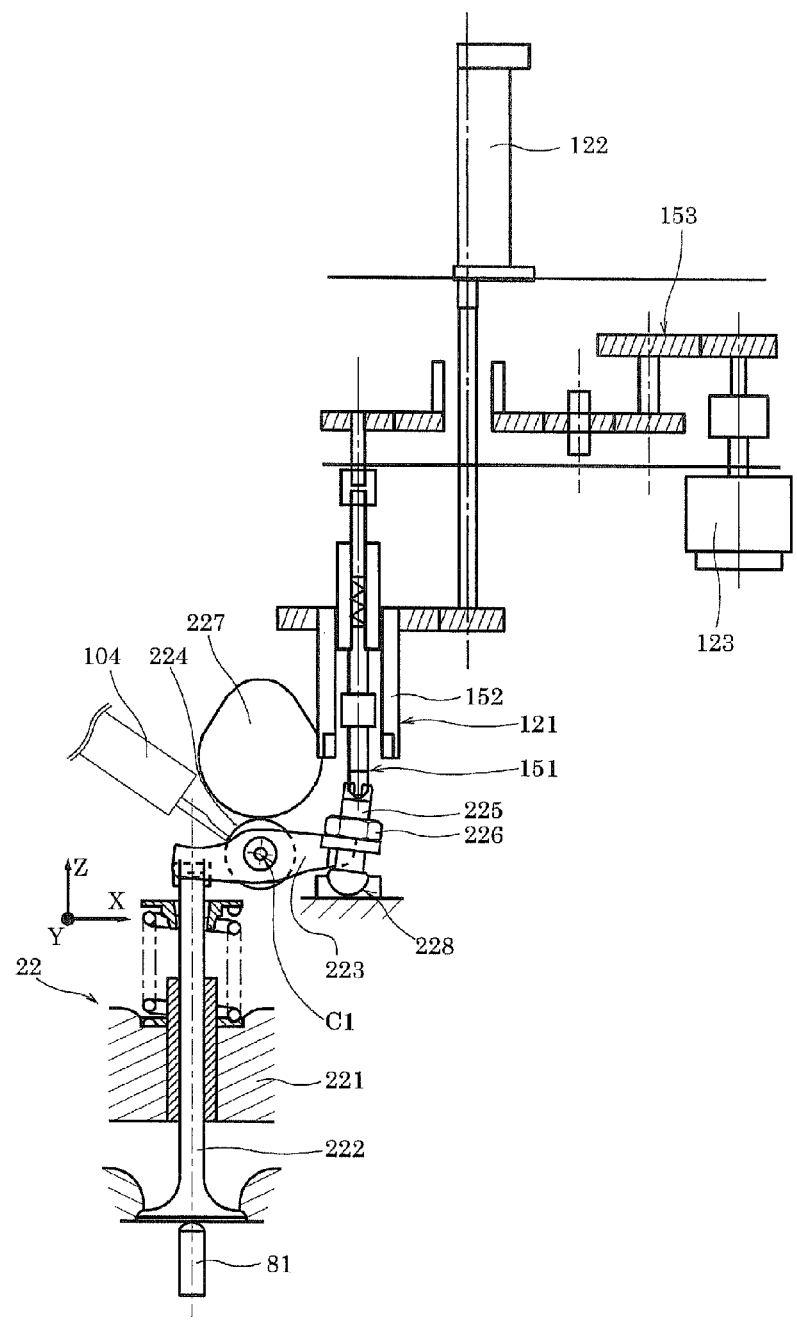
FIG. 15 is a schematic diagram showing an upper part of a cylinder head and a nut runner part to explain a valve clearance adjusting method according to a preferred embodiment of the present invention.

The nut runner part 120 consists of three units 120A to 120C. The units 120A, 120C are respectively provided with a pair of nut runners 121, and attached to the slider parts 142A, 142C. The unit 120B is provided with two pairs of the nut runners 121 and attached to the slider part 142B. The two pairs of nut runners 121 in the unit 120B are integrally fixed. Further, the nut runners 121 are arranged in a line along the X-axis direction. Then, each of the nut runners 121 is connected to a nut runner servomotor 122 for driving the nut runner 121 to rotate. The nut runner 121 has a double-layered structure, as shown in FIG. 15, in which a bit driver 151 fitted to the adjustment screw is arranged in a central region, and a tubular nut runner body 152 fitted to a nut 226 is disposed so as to surround the bit driver 151. The nut runner body 152 is connected to the above-described nut runner servomotor 122, while the bit driver 151 is connected via a reduction gear 153 to a bit driver servomotor 123.

Here, although the air cylinder has been described in this embodiment as a drive mechanism for the slider parts 142A to 142C in the slide unit by way of example, the drive mechanism is not limited to the air cylinder. For example, a linear motor and a ball screw may be employed in place of the air cylinder. Through the use of the linear motor and the ball screw as the drive mechanism for the slider parts 142A to 142C, it becomes possible to stop the slider parts 142A to 142C at multiple points of desired positions in the X-axis direction.

Further, in this embodiment, the example of driving the slider parts 142A, 142C together by means of the actuator 144B has been described, which is for purposes of illustration and not limitation. For example, an individual actuator may be provided for each of the slider parts 142A to 142C, to thereby drive the slider parts in a completely independent manner.

Still further, the number of units in the nut runner part 120 and the number of nut runners 121 provided for each of the units 120A to 120C may be arbitrarily selected. Even when the number of the nut runners 121 is smaller than that of valves 222, the slide unit 140 is able to respectively slide the units 120A to 120C in sequence, so that the nut runners 121 can be respectively associated with all the valves. Thus, the valve clearance can be adjusted in all of the valves 222 regardless of the number of cylinders and the number of valves in the engine.

Moreover, a first tilt mechanism part (not illustrated) may be installed in the first lifting part 130 of the valve clearance adjusting unit 110, to thereby swing the nut runner part 120 about the X-axis (about the axis of the conveying direction) as indicated by an arrow A114 in FIG. 11. The first tilt mechanism may be designed either to entirely swing the valve clearance adjusting unit 110, or to only swing the slide unit 140 and the nut runner part 120 without causing the first lifting part 130 to swing. In this way, the valve clearance adjusting device 10 of this embodiment can be adapted to the V type engine in addition to the straight type engine.

Now, operation of the valve clearance adjusting device according to a preferred embodiment of the present invention will be described below.

To begin with, the cylinder head 22 placed on the pallet 21 is transferred into the valve clearance adjusting device 10 by the conveyor device 30. The pallet 21 is transferred to a position immediately below the hold-down unit 90 and positioned in place by the stopper 61. The positioned pallet 21 is lifted down together with the conveyor device 30 by the lifting unit 60, and the cylinder head 22 is positioned in place by the cylinder head positioning part 63.

Next, both the upper vertical frame 95 in the hold-down unit 90 and the second mounting plate 741 (the third lifting part) in the camshaft rotating unit 70 are lowered at the same time. The lowering of the upper vertical frame 95 causes the cylinder head holding-down part 101 to hold down the top surface of the cylinder head 22. Thereafter, the third mounting plate 761 (the sliding part) is slid toward the camshaft 23, and the rotary coupling part 71 is accordingly fitted to the camshaft 23.

Next, the camshaft 23 is rotated through the rotary coupling part 72, to arrange a cam phase at a position where a cam crest does not interfere with the adjustment screw 225. After that, the rocker arm holding-down part 102 is extended toward the rocker arm 223, and the top surface of the rocker arm 223 is accordingly restrained by the hold-down member 104, to hold the adjustment screw 225 in a predetermined position (an erect state). Simultaneously with this, the first lifting part 130 of the valve clearance adjusting unit 110 is lifted down, thereby causing the nut runner part 120 to approach the cylinder head 22. In this way, the nut runner body 152 is fitted to the nut 226, while the bit driver 151 is fitted to the adjustment screw 225 in each nut runner 121. Subsequent to this, the rocker arm holding-down part 102 is retracted in a direction moving away from the rocker arm 223, to thereby disengage the rocker arm 223 from the hold-down member 104.

Next, adjustment of the valve clearance is performed for each valve 222, i.e. a clearance between a roller 224 of the rocker arm 223 and a camshaft 227 is adjusted. Details about the valve clearance adjustment will be discussed later. After adjusting the valve clearance, the first lifting part 130 is lifted up to separate the nut runner part 120 away from the cylinder head 22.

Here, for the valve 222 whose the valve clearance is not adjusted, each nut runner 121 can be moved to a position corresponding to the adjustment screw 225 of the desired valve 222 by causing the slide unit 140 in the valve clearance adjusting unit 10 to respectively slide the units 120A to 120C. Then, the above described processes of from adjusting the cam phase to separating the nut runner part are repeated in sequence for the valves 222 whose valve clearance is not adjusted, to complete valve clearance adjustment for all of the valves 122.

Next, the third mounting plate 761 is slid in a direction of separating the rotary coupling part 71 from the camshaft 23. Thereafter, the upper vertical frame 95 in the holding unit 90 and the second mounting plate 741 (the third lifting part) in the camshaft rotating unit 70 are simultaneously lifted up, to thereby release the cylinder head 22 having been retained by the cylinder head holding-down part 101 from the cylinder head holding-down part 101.

Finally, the positioning of the pallet 21 engaged with the stopper 61 is disengaged after the conveyor device 30 is moved up by the lifting unit 60. Then, the conveyor device 30 is activated to transfer the pallet 21, on which the cylinder head 22 adjusted for the valve clearance is placed, to a subsequent process and newly transfer into the valve clearance adjusting device 10 another pallet 21, on which a cylinder head 22 unadjusted for the valve clearance is placed.

A valve clearance adjusting method according to a preferred embodiment of the present invention will be described below.

Figure 16:
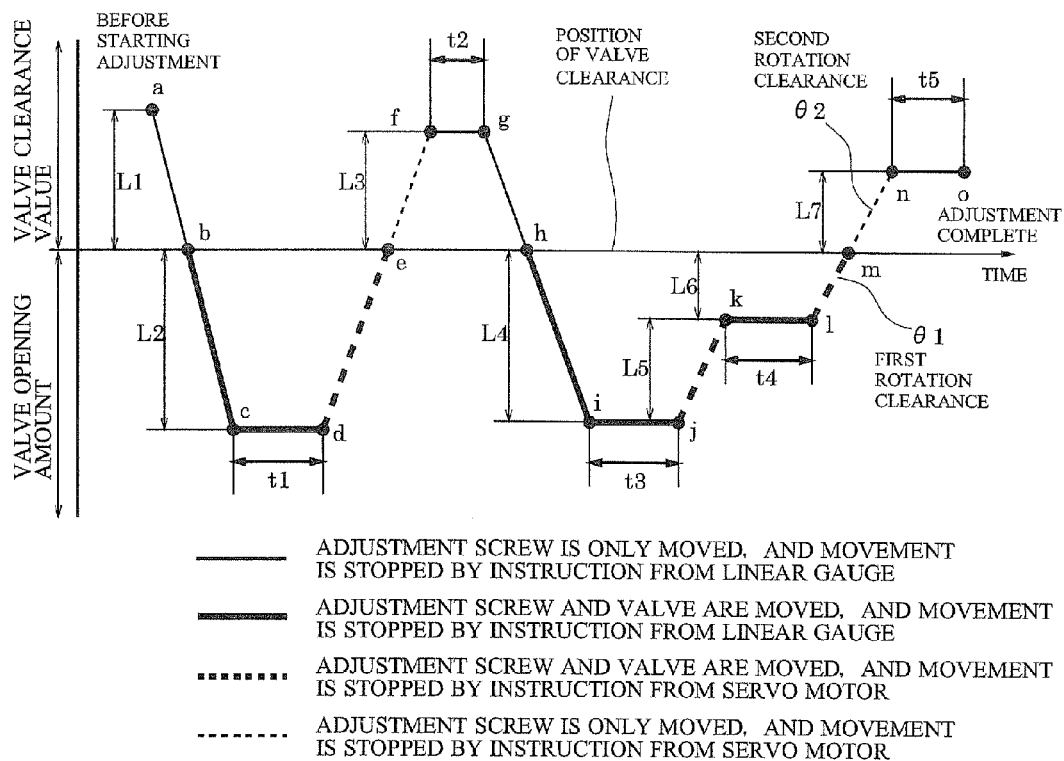
FIG. 16 is a diagram showing a relationship between a travel amount of the adjustment screw and a travel amount of a valve with respect to time.

FIG. 15 shows a schematic diagram of an upper part of the cylinder head and the nut runner part for explaining the valve clearance adjusting method according to the preferred embodiment of this invention, and FIG. 16 shows a relationship between a valve clearance value and a valve opening amount with respect to time.

As shown in FIG. 15, the valve 222 is inserted into a cylinder head body 221 of the cylinder head 22 to be used in the valve clearance adjusting method according to this embodiment. One end (a left end in the figure) of the rocker arm (the roller rocker arm) 223 is connected to an end (an upper end in the figure) of the valve 222. The adjustment screw 225 is screwably connected to the other end of the rocker arm 223. A lower end section of the adjustment screw 225 is swingably attached to the cylinder head body 221. The rotatable camshaft 227 for opening and closing the valve 222 is disposed so as to be opposed to the camshaft contact section (the roller) 224 of a circular-shaped surface in the rocker arm 223. The rocker arm 223 whose center of rotation is not secured by a rocker shaft or the like is in a free state where the rocker arm 223 is only connected at its both ends to the valve 222 and the adjustment screw 225. In addition, the lower end section of the adjustment screw 225 is swingably supported via a pivot bearing 228 which is fixed to the cylinder head body 221.

The term "valve clearance" as used herein denotes a clearance between the camshaft 227 and the roller 224.

<Running-In Operation Step>

Figure 17:
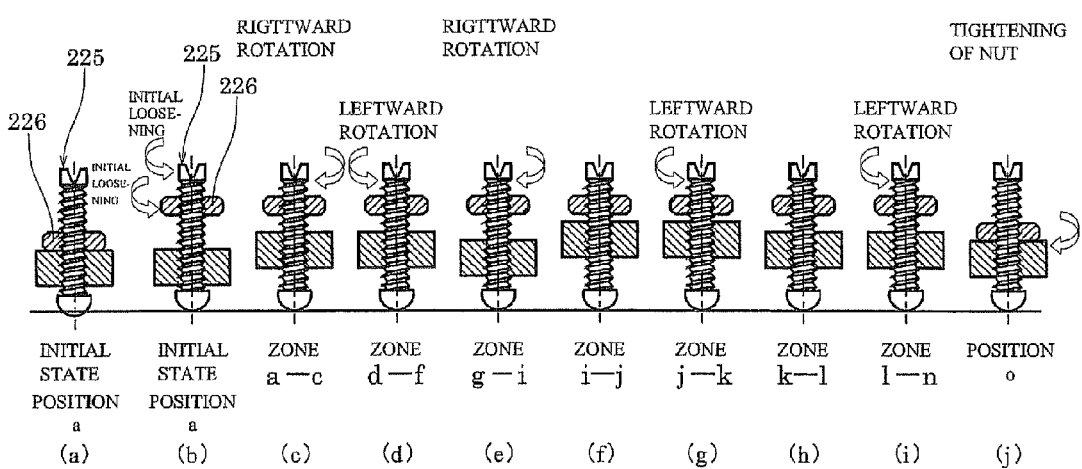
FIG. 17 is a diagram for explaining conditions of rotating the adjustment screw in FIG. 16.

Firstly, the adjustment screw 225 and the nut 226 which are in their initial states as shown in FIG. 17 (a) are subjected to initial loosening operation (FIG. 17 (b)). Then, as shown in FIG. 17 (c), the adjustment screw 225 is rotated in one direction (rotated rightward), to tighten up the adjustment screw 225 from the initial state (position a) where the camshaft 227 is separated from the roller 224 by a certain valve clearance value L1 through a state where the valve clearance is zero (a state of valve opening amount zero; position b) to a state (position c) where the valve 222 is released with a certain valve opening amount L2 (zone a-c in FIG. 16). Then, the certain released state of the valve is maintained for a given first stabilization time t1. (zone c-d). Thereafter, the adjustment screw 225 is rotated in a reverse direction (rotated leftward) as shown in FIG. 17 (d), to thereby loosen the adjustment screw. 225 from the certain released state (position d) of the valve through valve clearance zero (position e)

up to a state (position f) separated by a given valve clearance value L3 (zone d-f in FIG. 16). Then, this separated state is maintained for a given time t2 (zone f-g in FIG. 16).

Here, when the adjustment screw 225 is rotated in a tightening direction, rotation of the adjustment screw 225 is stopped based on a measurement value from the valve opening amount measuring unit 80 which measures an opening amount of the valve 222. On the other hand, when the adjustment screw 225 is rotated in a loosening direction, the rotation of the adjustment screw 225 is stopped based on a rotation value from the servomotor 151 (refer to FIG. 15) which rotates the adjustment screw 225.

Further, as the adjustment screw 225 is tightened, the valve clearance is gradually reduced, and after reaching the state of valve opening amount zero, the valve 22 is gradually opened. On the other hand, as the adjustment screw 225 is loosened, the valve opening amount is gradually reduced, and after reaching the state of valve opening amount zero, the valve clearance is gradually increased.

<Tightening Step>

Next, as shown in FIG. 17 (e), the adjustment screw 225 is rotated in the one direction to tighten the adjustment screw 225 again from a given state (position g) where the camshaft 227 is separated from the roller 224 via a state of valve opening amount zero (position h) where the camshaft 227 is brought into contact with the roller 224 up to a state (position i) where the valve 222 is released again with a given valve opening amount L4 (zone g-i in FIG. 16). Then, as shown in FIG. 17 (f), the released state is maintained for a given second stabilization time t3 (zone i-j in FIG. 16, a first stabilization step).

<Backlash Removing Step>

Next, the adjustment screw 225 is rotated in the reverse direction to thereby reduce the opening amount of the valve 222 by a desired amount as shown in FIG. 17 (g). Specifically, the valve 222 is lifted up by a travel amount L5 for loosening the adjustment screw 225 to a backlash removing position (position k), where the adjustment screw 225 has a given valve opening amount L6 (=L4−L5), between the released state (position j) of the valve 222 and the state (position m) of the valve opening amount zero (zone j-k in FIG. 16). Then, as shown in FIG. 17 (h), the adjustment screw 225 is maintained for a given third stabilization time t4 (zone k-l in FIG. 16, a second stabilization step).

Here, while the valve is open (lifted up), i.e. in the zone h-l, the opening amount of the valve 222 is measured by the linear gauge 81 (the valve opening amount measuring unit) in real time (a valve opening amount measuring step).

Mechanical backlash (looseness) of the adjustment screw 225, the rocker arm 223, and others is removed by including, between the tightening step and a clearance adjusting step (to be discussed below), the backlash removing step of rotating in a direction opposite to that in the tightening step. Although the rotation is performed along the same direction both in the backlash removing step and in the clearance adjusting step, a rotation angle in the backlash removing step need not be the same as that in the clearance adjusting step, and a smaller rotation angle may be sufficient for the backlash removing step.

<Clearance Adjusting Step>

Then, the adjustment screw 225 is further rotated in the reverse direction as shown in FIG. 17 (i) from the backlash removing position (position l) of the given valve opening amount L6 via a state (position m) of the valve opening amount zero until a desired valve clearance value L7 is obtained after the camshaft 227 is separated from the roller 224 (position n) (zone l-n in FIG. 16). Thereafter, the adjustment screw 225 is maintained for a given time t5 (zone n-o). Finally, the nut 226 is tightened enough as shown in FIG. 17 (j), and adjustment of the valve clearance is complete.

In a conventional valve clearance adjusting method, the clearance adjusting step is performed as described below. Firstly, a zero point (the position in) where the valve clearance becomes zero is found while rotating the adjustment screw in the reverse direction from the backlash removing position (the position l), and the adjustment screw is further rotated by a desired angle based on the zero point to obtain a desired valve clearance value without stopping the rotation.

However, because the zero point can be found only by identifying that lifting of the valve is stopped, the valve clearance value is, in a strict sense, not 0 ([valve clearance value] >0) at that zero point. Therefore, when adjustment to the desired valve clearance value is made based on the zero point which does not accurately reflect the valve clearance value of 0, the obtained resulting valve clearance value would be inaccurate as a natural result.

The valve clearance adjusting method according to this embodiment is characterized in an adjustment process in the clearance adjusting step. Specifically, in the clearance adjusting step in which rotation of the bit servomotor 123 is controlled, or regulated by a controller 300, the adjustment screw 225 is rotated by a given rotation angle θ in the reverse direction, to thereby loosen the adjustment screw 225 from the backlash removing position (the position l) to a position where the predetermined valve clearance value L7 is obtained (position n). The given rotation angle θ is determined as described below.

Here, in the roller 224 of the rocker arm 223 shown in FIG. 15, its center of rotation is not fixed by a rocker shaft or the like (capable of moving), and will be changed depending on whether the camshaft 227 is in contact with the roller 224. For this reason, it has been difficult to accurately determine the given rotation angle θ. The inventors have sorted cases based on whether or not the camshaft 227 is in contact with the roller 224 and found a relationship between the rotation angle of the adjustment screw 225 and the valve clearance value or the valve opening amount using model diagrams in a case where the camshaft 227 is in contact with the roller 224 and in a case where the camshaft 227 is separated from the roller 224. The "case where the camshaft 227 is in contact with the roller 224" as used herein means a condition that the valve opening amount is 0 or greater (inclusive of 0), while the "case where the camshaft 227 is separated from the roller 224" means a condition that the valve clearance value is greater than 0 (exclusive of 0).

Figure 18:
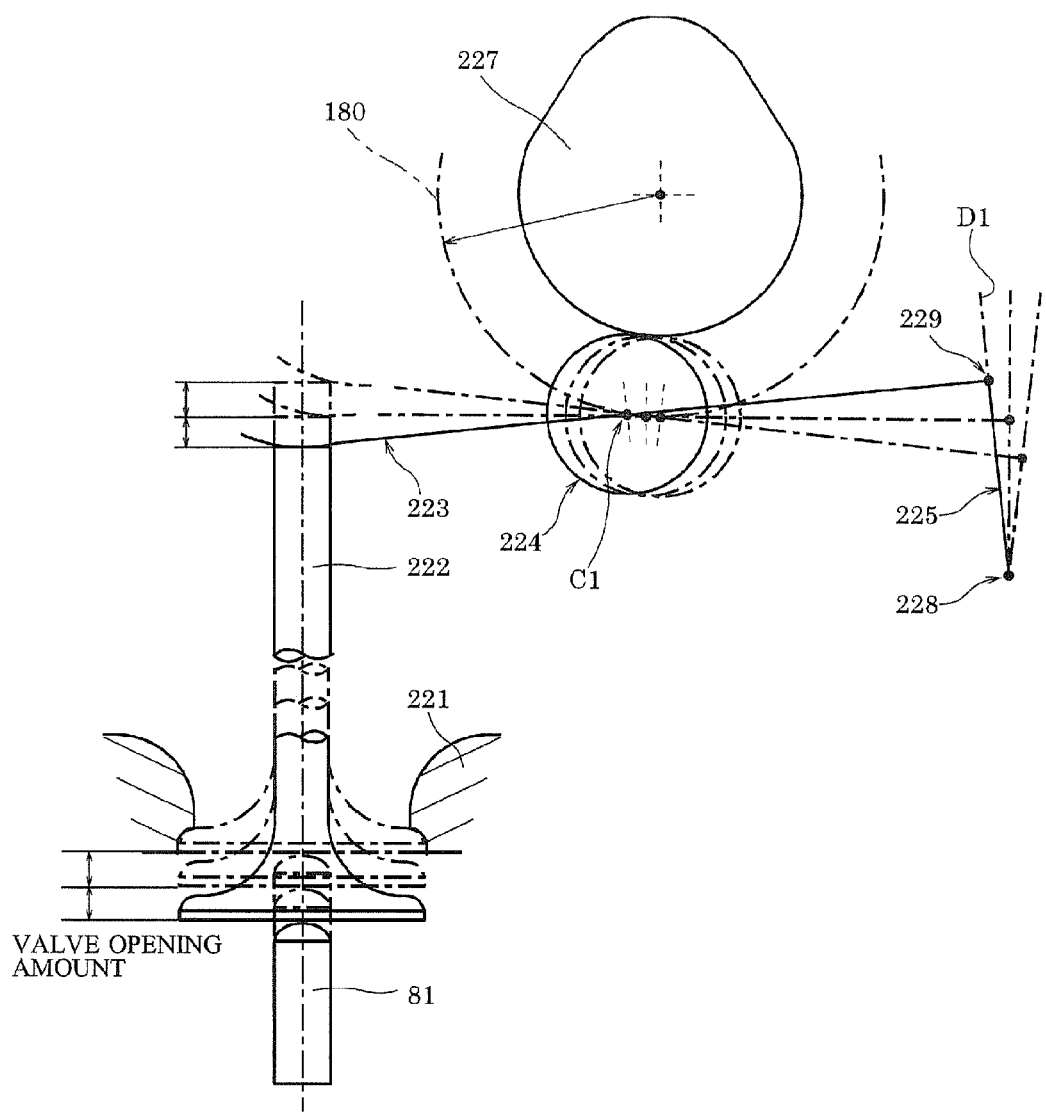
FIG. 18 is a schematic diagram for explaining a relationship between a rotation angle of the adjustment screw and the travel amounts of the adjustment screw and the valve when the camshaft is in contact with a roller.

That is to say, when the camshaft 227 is in contact with the roller 224 (in the zone l-m in FIG. 16), rotation of the adjustment screw 225 causes the rocker arm 223 to rotate (clockwise in the figure) as shown FIG. 18 using both a center C1 of a circular surface of the roller 224 and the other end (a right end in FIG. 18) of the rocker arm 223 as a support point. At this time, as the rocker arm 223 is rotated, the center C1 of the circular surface is moved along a cam surface of the camshaft 227, i.e. along an arc 180. Further, when the center C1 of the circular surface is moved, an angle of an axis line direction D1 of the adjustment screw 225 is accordingly changed. Also, when the center C1 of the circular surface is moved, a location of a contact point 229 between the rocker arm 223 and the adjustment screw 225 is accordingly shifted, thereby reducing a distance between the contact point 229 and the pivot bearing 228.

A relationship between the rotation angle of the adjustment screw 225 and a raised amount of one end of the rocker arm 223, i.e. the travel amount of the valve 222 (the valve opening amount) in the zone l-m is modeled in order to allow the relationship to be determined by a formula. In other word, it can be determine in the zone l-m by the formula how much elevation of the valve 222 (how much reduction of the valve opening amount) is caused by what degree of rotation of the adjustment screw 225. Thus, the relationship between the rotation angle of the adjustment screw 225 and the valve opening amount in that zone can be obtained in advance. Then, based on the obtained relationship, a first rotation angle θ1 which is the rotation angle of the adjustment screw 225 can be uniquely determined by finding the travel amount of the valve 222 necessary to reach the position where the camshaft 227 is brought into contact with the roller 224 (the position m) from the backlash removing position (the position l). The valve opening amount at the position l is measured in real time by the linear gauge 81 (the valve opening amount measuring unit) as described above. Therefore, because the valve opening amount is known, the travel amount L6 of the valve 222 can be, of course, readily found, and the first rotation angle θ1 is uniquely determined accordingly.

Figure 19:
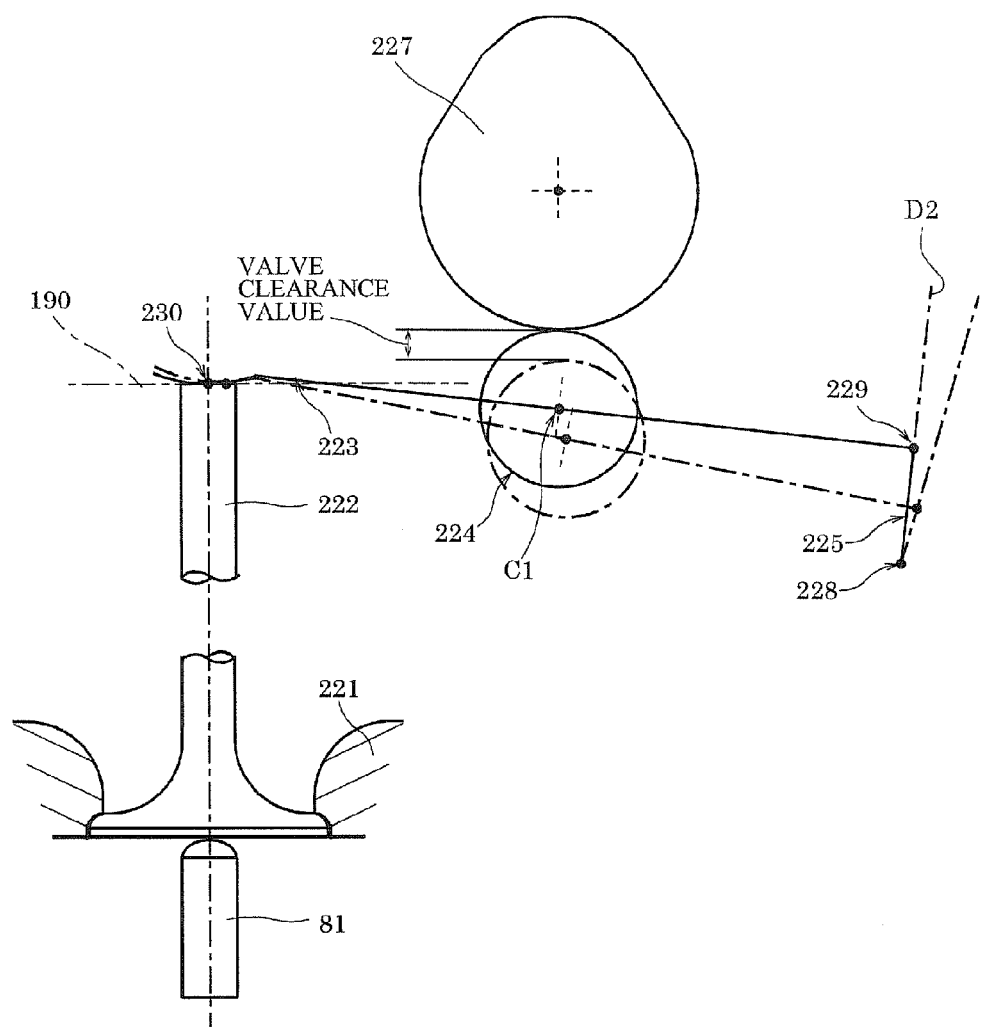
FIG. 19 is a schematic diagram for explaining the relationship between the rotation angle of the adjustment screw and the travel amount of the adjustment screw when the camshaft is separated from the roller.

On the other hand, when the camshaft 227 is separated from the roller 224 (in the zone m-n of FIG. 16), the rotation of the adjustment screw 225 causes, as shown in FIG. 19, the rocker arm 223 to rotate (clockwise in the figure) using one end (a left end in FIG. 19) of the rocker arm 223 as the support point. At this time, a contact point 230 between the one end of the rocker arm 223 and the valve 222 is shifted along an upper end height of the valve 22, i.e. along a line 190 to a camshaft 227 side (a right side in the figure), while remaining a height of the contact point 230 unchanged. Then, as the rocker arm 223 is rotated, the center C1 of the circular surface is accordingly moved in a direction away from the cam surface of the camshaft 227. Further, when the center C1 of the circular surface is moved, the angle of an axis line direction D2 of the adjustment screw 225 is accordingly changed, thereby reducing the distance between the contact point 229 and the pivot bearing 228.

A relationship between the rotation angle of the adjustment screw 225 and the distance from the contact point 229 to the pivot bearing 228, i.e. the travel amount of the valve 222 in the above-described zone m-n is modeled in order to allow the relationship to be determined by a formula. In other word, it can be determine in the zone m-n by the formula how much loosening of the adjustment screw 225 is caused by what degree of rotation of the adjustment screw 225. Thus, the relationship between the rotation angle of the adjustment screw 225 and the travel amount of the adjustment screw 225 in that zone can be obtained in advance. Then, based on the obtained relationship, a second rotation angle θ2 which is the rotation angle of the adjustment screw 225 can be uniquely determined by finding the travel amount of the adjustment screw 225 necessary to reach the position (the position n) where the desired valve clearance value L7 is obtained from the position (the position m) where the camshaft 227 is brought into contact with the roller 224. When the desired valve clearance value L7 is determined, the travel amount of the adjustment screw 225 can be inevitably found easily, and the second rotation angle θ2 is uniquely determined.

A sum of the obtained first and second rotation angles θ1 and θ2 is taken as a given rotation angle θ (=θ1+θ2), and the adjustment screw 225 is rotated by the given rotation angle θ in the reverse direction without stopping in the zone l. As a result of this, the desired valve clearance value L7 (the zone n) can be obtained.

As has been described, in the valve clearance adjusting method according to this embodiment, the valve clearance value is adjusted based on actually measured data (real time data from the linear gauge 81) in the zone l-n. Then, in the valve clearance adjusting step for adjusting the valve clearance value, because the rocker arm 223 behaves in different ways between the two zones (l-m, m-n), a different formula is used for each of the zones to determine the given rotation angle θ of the adjustment screw 225.

Therefore, in the cylinder head 22 using the rocker arm 223 of a support point adjustable type which exhibits different behaviors depending on whether or not the camshaft 227 is in contact with the roller 224, the valve clearance can be adjusted with a high degree of precision.

This embodiment has been described with reference, by way of example, to the rocker arm whose camshaft contact section is the roller. It is, however, obvious that the valve clearance adjusting method according to this embodiment is not limited to adjustment of the valve clearance in the cylinder head using the rocker arm of the above-described type, and may be applied to adjustment of the valve clearance in a cylinder head including a rocker arm whose camshaft contact section is a slipper surface.

Next, another embodiment of the present invention will be described with reference to the accompanying drawing.

In the valve clearance adjusting method according to the previous embodiment, the backlash removing step is performed to remove purely mechanical backlash.

In contrast, the valve clearance adjusting method according to this embodiment differs in a way that in addition to removing backlash, rotation controlling is corrected in the backlash removing step. Details other than the above-indicated different point are identical to those of the valve clearance adjusting method according to the previous embodiment, and only the different point will be described below.

In the backlash removing step, the adjustment screw 225 is rotated in the reverse direction for loosening the adjustment screw 225 to the given backlash removing position (zone k) between the released state of the valve 22 (zone j) and the state of the valve opening amount zero (zone m), and backlash is removed there.

At this time, the travel amount L5 of the valve calculated by the bit servomotor 123 which controls rotation of the adjustment screw 225 is compared with the valve opening amount L6 actually measured by the linear gauge 81 (a comparing step). A calculational valve opening amount L6 is obtained by subtracting L5 from L4. Then, a difference between the calculated value and the actually measured value is found by comparing the calculational valve opening amount L6 and the actually measured valve opening amount L6. Through feedback of the difference to the bit servomotor 123 for correction, controlling of rotation can be performed more closely depending on the actual value, and become more accurate in the subsequent clearance adjusting step.

The present invention is not limited to the embodiments set forth above, and it is obvious that various types of other modifications are contemplated as well.

What is claimed is:

1. A valve clearance adjusting method for adjusting a valve clearance in a cylinder head comprising a valve incorporated in a cylinder head body, a rocker arm connected at one end thereof to an end of the valve, an adjustment screw screwably connected to the other end of the rocker arm and having a lower end section swingably supported by the cylinder head body, and a camshaft contacted by a camshaft contact section of a circular-shaped surface in the rocker arm and capable of rotating to open and close the valve, the method comprising:

rotating the adjustment screw in one direction to tighten the adjustment screw until the valve is released to attain a certain valve opening amount;

subsequently rotating the adjustment screw in a reverse direction by a certain rotation angle to loosen the adjustment screw from a position where the valve is released to attain the certain valve opening amount up to a position where the camshaft is separated from the camshaft contact section by a desired valve clearance value;

when the camshaft is in contact with the camshaft contact section, rotating the rocker arm using both a center of the circular-shaped surface of the camshaft contact section and the other end of the rocker arm as a support point, and determining a first rotation angle by which the adjustment screw should be rotated to reach a position where both a valve opening amount and a valve clearance value are zero from the position where the valve is released with the certain valve opening amount, based on a relationship between an adjustment screw rotating angle and the valve opening amount during rotation of the rocker arm;

when the camshaft is separated from the camshaft contact section, rotating the rocker arm using the one end of the rocker arm as the support point, and determining a second rotation angle by which the adjustment screw should be rotated to reach a position where the desired valve clearance value is obtained from the position where both the valve opening amount and a valve clearance value are zero, based on a relationship between an adjustment screw rotating angle and the valve clearance value during rotation of the rocker arm; and rotating the adjustment screw in the reverse direction by a given rotation angle which is a sum of the first and second rotation angles.

2. A valve clearance adjusting method for adjusting a valve clearance in a cylinder head comprising a valve incorporated in a cylinder head body, a rocker arm connected at one end thereof to an end of the valve, an adjustment screw screwably connected to the other end of the rocker arm and having a lower end section swingably supported by the cylinder head body, and a camshaft contacted by a camshaft contact section of a circular-shaped surface in the rocker arm and capable of rotating to open and close the valve, the method comprising:

a tightening step in which the valve is lifted up by rotating the adjustment screw in one direction to tighten up the adjustment screw from a state where the camshaft is separated from the camshaft contact section via a state where both a valve opening amount and a valve clearance value are zero and the camshaft comes in contact with the camshaft contact section up to a state where the valve is released to attain a certain valve opening amount;

a valve opening amount measuring step of measuring, in real time, an opening amount of the valve using a measurement means while the valve is open;

a backlash removing step of rotating the adjustment screw in a reverse direction to loosen the adjustment screw until it reaches a given backlash removing position between the state where the valve is released with the certain valve opening amount and the state where the valve opening amount is zero;

a clearance adjusting step of further rotating the adjustment screw in the reverse direction to reach a position where a desired valve clearance value is obtained between the camshaft and the camshaft contact section which are separated from each other subsequent to the state where the valve opening amount is zero;

when the camshaft is in contact with the camshaft contact section, rotating the rocker arm using both a center of the circular-shaped surface of the camshaft contact section and the other end of the rocker arm as a support point, and determining a first rotation angle by which the adjustment screw should be rotated to reach a position where both a valve opening amount and a valve clearance value are zero from the backlash removing position, based on a relationship between an adjustment screw rotating angle and the valve opening amount during rotation of the rocker arm;

when the camshaft is separated from the camshaft contact section, rotating the rocker arm using one end of the rocker arm as the support point, and determining a second rotation angle by which the adjustment screw should be rotated to reach the position where the desired valve clearance value is obtained from the position where both the valve opening amount and a valve clearance value are zero, based on a relationship between an adjustment screw rotating angle and the valve clearance value during rotation of the rocker arm; and rotating the adjustment screw in the reverse direction by a given rotation angle which is a sum of the first and second rotation angles.

3. A valve clearance adjusting method according to claim 2, further comprising, prior to the tightening step, performing a fitting operation step, wherein:

the fitting operation step comprises;

rotating the adjustment screw in the one direction to thereby tighten the adjustment screw from an initial state where the camshaft is separated from the camshaft contact section until the valve is released to attain the certain valve opening amount;

thereafter, maintaining a state where the valve is released with the certain valve opening amount for a first stabilization time, and thereafter, rotating the adjustment screw in the reverse direction to thereby loosen the adjustment screw from the state where the valve is released with the certain valve opening amount to the initial state.

4. A valve clearance adjusting method according to claim 2, wherein:

when the adjustment screw is rotated in a tightening direction, a valve moving amount is found based on a measurement value from a valve opening amount measuring unit for measuring an opening amount of the valve, and a servomotor for rotating the adjustment screw is rotated and stopped based on the valve moving amount, and when the adjustment screw is rotated in a loosening direction, an adjustment screw moving amount is found based on a rotation value of the servomotor for rotating the adjustment screw, and the servomotor is rotated and stopped based on the adjustment screw moving amount.

5. A valve clearance adjusting method according to claim 2, wherein:

in the backlash removing step, while backlash is removed by rotating the adjustment screw in a reverse direction to loosen the adjustment screw until it reaches the given backlash removing position between the state where the valve is released with the certain valve opening amount and the state where the valve opening amount is zero, a valve moving amount calculated by the servomotor for rotating and controlling the adjustment screw is compared with a valve opening amount measured by the measurement means to obtain a difference therebetween, and the difference is sent back to the servomotor to implement corrections for the rotating and controlling.

6. A valve clearance adjusting method according to claim 2, further comprising: a first stabilization step of maintaining a present state for a given second stabilization time between the valve opening amount measuring step and the backlash removing step, and a second stabilization step of maintaining a present state for a given third stabilization time between the backlash removing step and the clearance adjusting step.

* * * * *